United States Patent
Fukagawa et al.

(10) Patent No.: US 7,598,847 B2
(45) Date of Patent: Oct. 6, 2009

(54) VEHICLE THEFT DETECTION SYSTEM

(75) Inventors: Satoru Fukagawa, Kariya (JP); Teruhito Suzuki, Kariya (JP); Norifumi Souda, Obu (JP)

(73) Assignee: DENSO CORPORATION, Kariya (JP)

( * ) Notice: Subject to any disclaimer, the term of this patent is extended or adjusted under 35 U.S.C. 154(b) by 331 days.

(21) Appl. No.: 11/543,988

(22) Filed: Oct. 6, 2006

(65) Prior Publication Data

US 2007/0080792 A1    Apr. 12, 2007

(30) Foreign Application Priority Data

| Oct. 7, 2005 | (JP) | ............................. 2005-294732 |
| Nov. 9, 2005 | (JP) | ............................. 2005-324882 |
| Nov. 9, 2005 | (JP) | ............................. 2005-324883 |

(51) Int. Cl.
B60R 25/10    (2006.01)
(52) U.S. Cl. .................................. 340/426.25; 340/429
(58) Field of Classification Search ............. 340/426.25
See application file for complete search history.

(56) References Cited

U.S. PATENT DOCUMENTS

| 4,574,268 | A | * | 3/1986 | Ohnishi ................. 340/426.28 |
| 4,651,128 | A | | 3/1987 | Kolb |
| 5,808,544 | A | | 9/1998 | Kani et al. |
| 5,856,778 | A | | 1/1999 | Kani et al. |
| 5,963,128 | A | * | 10/1999 | McClelland ................. 340/447 |
| RE38,378 | E | * | 1/2004 | Montague ............... 340/426.19 |
| 2002/0041125 | A1 | * | 4/2002 | Okamitsu et al. .......... 307/10.5 |
| 2003/0160692 | A1 | * | 8/2003 | Nonaka ................. 340/539.11 |
| 2004/0075539 | A1 | * | 4/2004 | Savoie et al. ............. 340/426.1 |
| 2004/0075541 | A1 | * | 4/2004 | Simoneau ............... 340/426.11 |
| 2004/0090344 | A1 | * | 5/2004 | Caretta et al. .......... 340/870.07 |
| 2004/0094912 | A1 | * | 5/2004 | Niwa et al. .............. 280/5.518 |
| 2004/0160314 | A1 | * | 8/2004 | Utter et al. ............... 340/426.1 |
| 2005/0012501 | A1 | * | 1/2005 | Isono et al. .................. 324/300 |
| 2005/0080544 | A1 | * | 4/2005 | Suzuki et al. .................. 701/70 |
| 2005/0082913 | A1 | * | 4/2005 | Nomura ..................... 307/10.1 |
| 2005/0093683 | A1 | * | 5/2005 | Wee et al. ................. 340/426.1 |
| 2005/0146422 | A1 | * | 7/2005 | Ando et al. .............. 340/426.1 |
| 2005/0151629 | A1 | * | 7/2005 | Simoneau ............. 340/426.11 |
| 2006/0244577 | A1 | | 11/2006 | Tanaka et al. |

(Continued)

FOREIGN PATENT DOCUMENTS

| DE | 42 02 381 | 8/1993 |
| DE | 199 35 456 | 7/2000 |
| DE | 101 10 493 | 9/2002 |

(Continued)

OTHER PUBLICATIONS

Office Action dated May 21, 2008 in corresponding Japanese Patent Application No. 2005-294732 (and English Translation).

(Continued)

*Primary Examiner*—Daniel Wu
*Assistant Examiner*—John F Mortell
(74) *Attorney, Agent, or Firm*—Posz Law Group, PLC

(57) ABSTRACT

A tilt sensor, height sensors and tire pressure sensors sense a behavior of a parked vehicle and output an angle signal, a height signal and a pressure signal, respectively. These sensor signals are obtained by a sensor signal obtaining section. An initial value setting section sets an initial sensor signal of each of the tilt sensor, the height sensors and the tire pressure sensors as an initial value of that sensor. Then, a comparing section compares each initial value with the current sensor signal. Based on a result of the comparison, a determining section determines whether the vehicle is stolen.

25 Claims, 12 Drawing Sheets

FOREIGN PATENT DOCUMENTS

| | | |
|---|---|---|
| DE | 103 23 038 | 2/2004 |
| EP | 1 312 520 | 11/2002 |
| GB | 2 244 163 A | 11/1991 |
| GB | 2 397 930 A | 8/2004 |
| JP | H-09-240432 | 9/1997 |
| JP | A-2002-362318 | 12/2002 |
| JP | A-2003-34233 | 2/2003 |
| JP | A-2005-247075 | 9/2005 |

OTHER PUBLICATIONS

Office Action dated May 21, 2008 in corresponding Japanese Patent Application No. 2005-324882 (and English Translation).

Office Action dated Jun. 20, 2008 in corresponding German patent application No. 10 2006 047 390.6-51 (and English translation).

* cited by examiner

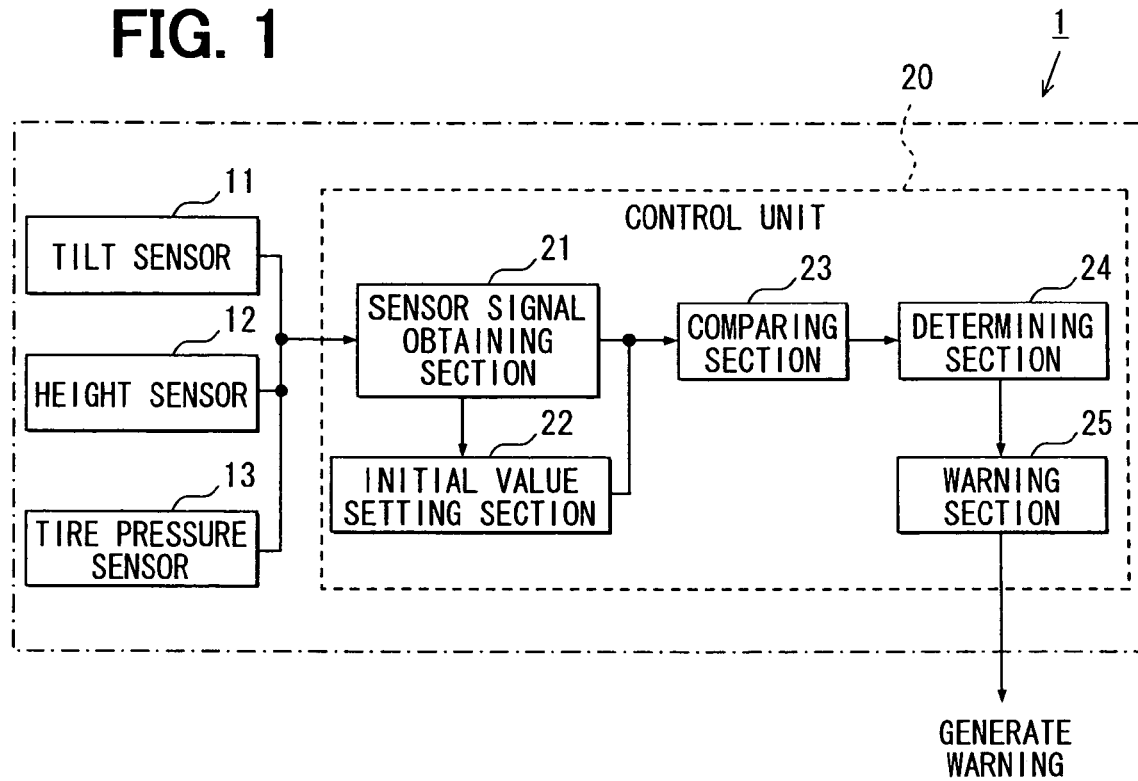
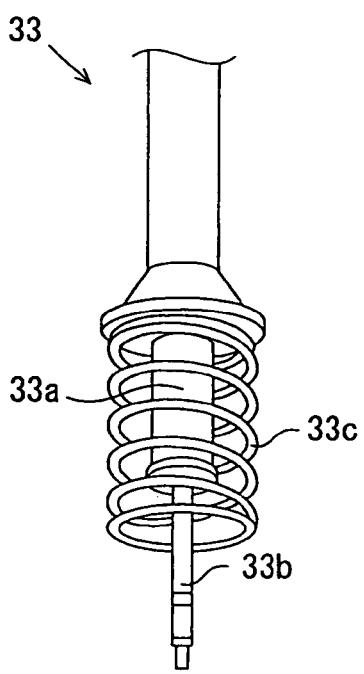

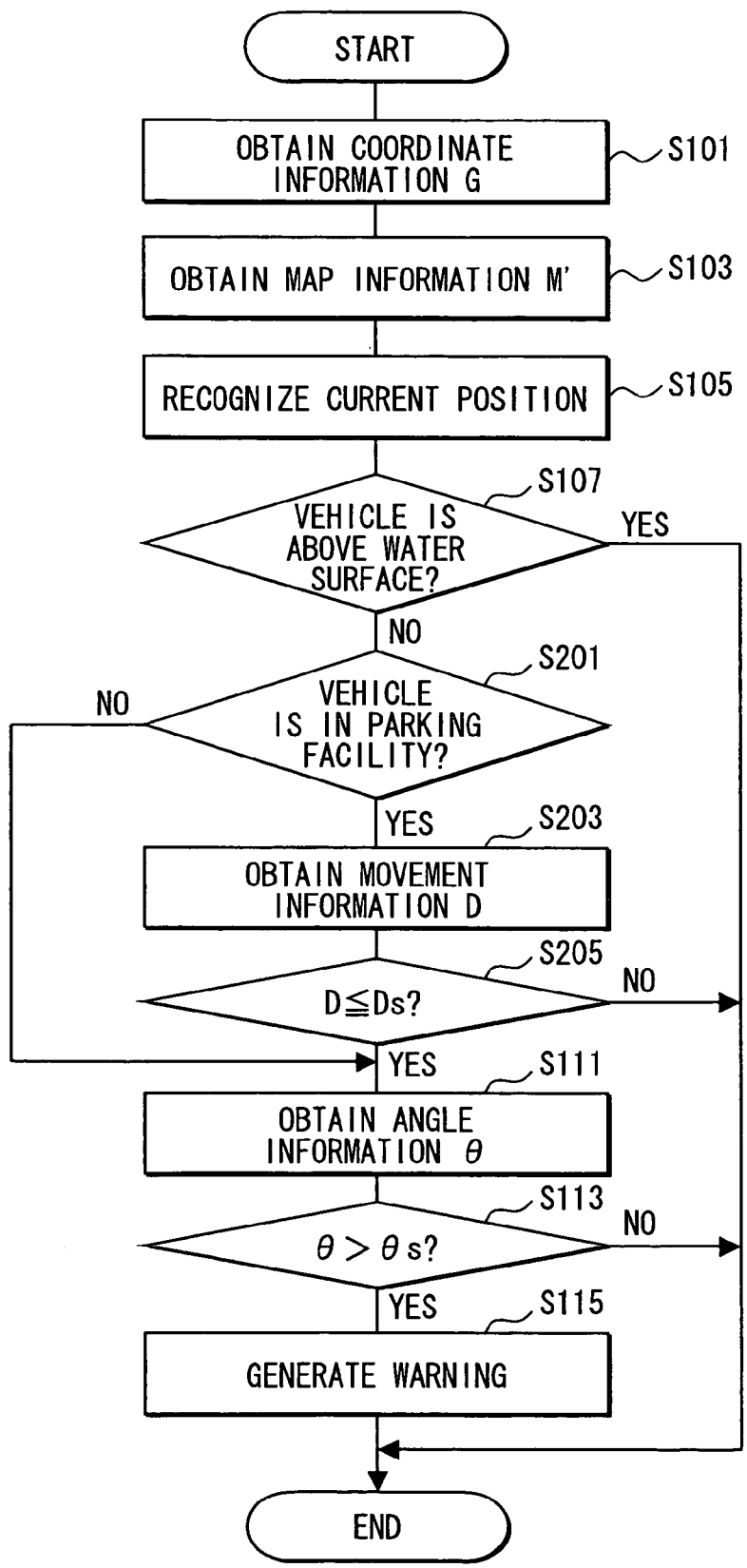

VEHICLE THEFT DETECTION SYSTEM

CROSS REFERENCE TO RELATED APPLICATION

This application is based on and incorporates herein by reference Japanese Patent Application No. 2005-294732 filed on Oct. 7, 2005, Japanese Patent Application No. 2005-324882 filed on Nov. 9, 2005 and Japanese Patent Application No. 2005-324883 filed on Nov. 9, 2005.

BACKGROUND OF THE INVENTION

1. Field of the Invention

The present invention relates to a vehicle theft detection system.

2. Description of Related Art

In a previously proposed vehicle theft detection system, when an abnormal tilt of a vehicle is sensed by a tilt sensor in a parked state of the vehicle, vehicle position information, which is sensed through a global positioning system (GPS), is transmitted along with an abnormality signal from the vehicle theft detection system to a predetermined destination. For example, the abnormal tilt of the vehicle may be sensed by the tilt sensor to sense stealing of the vehicle when front wheels of the vehicle are lifted and towed by a wrecker without a notification to a user of the vehicle. A previously proposed vehicle theft prevention system generates a warning based on the detection of the stealing of the vehicle, which is detected by the vehicle theft detection system to limit or prevent stealing of the vehicle.

For example, Japanese Unexamined Patent Publication No. H09-240432 teaches a technique, which uses a tilt sensor. According to this technique, when the front wheels of the vehicle are lifted by, for example, a wrecker to tow the vehicle without a notification to a user or an owner of the vehicle, a tilt of the parked vehicle significantly changes, and this tilt of the vehicle is sensed by the tilt sensor to detect the stealing of the vehicle.

In the above vehicle theft detection system, which detects the abnormal tilt of the vehicle thorough the tilt sensor, when the vehicle is parked on a pallet of a pallet type multilevel parking facility, a normal tilt of the vehicle caused by the vertical movement of the pallet may be erroneously sensed as the abnormal tilt although the vehicle is kept parked safely. Furthermore, in a case where the vehicle is transported by a ferry along the sea, when the ferry is tilted by swing movement of the ferry caused by wave motion of the sea, this normal tilt of the vehicle may be erroneously sensed as the abnormal tilt. That is, the prior art vehicle theft detection system cannot distinguish a change in the tilt of the vehicle caused by the stealing of the vehicle from the normal tilt of the vehicle, which is caused by the incident other than the stealing of the vehicle, thereby resulting in an erroneous detection of the stealing of the vehicle.

In view of the above disadvantage, Japanese Unexamined Patent Publication No. 2003-34233 discloses an improved vehicle theft detection system that allows a user of a vehicle to change an operational mode of the vehicle theft detection system from one to another. These operational modes include a parking mode, a multilevel parking mode and a release mode. The parking mode is set when the user leaves the vehicle. The multilevel parking mode is set when the vehicle is parked in the multilevel parking facility. The release mode is set when the user uses the vehicle. When the vehicle is parked in the multilevel parking facility, the user sets the multilevel parking mode. In the multilevel parking mode, even when the tilt sensor senses an abnormal tilt of the vehicle in the parked state of the vehicle, the vehicle theft detection system will not determine that the vehicle is stolen. In this way, the erroneous detection of the stealing of the vehicle can be avoided.

However, in the case of the vehicle theft detection system of Japanese Unexamined Patent Publication No. 2003-34233, the user may forget to set the multilevel parking mode at the time of parking the vehicle in the multilevel parking facility and may leave the vehicle while setting the vehicle theft detection system in the parking mode. In such an instance, the tilt sensor senses the tilt of the vehicle, which is caused by the movement of the pallet, as the abnormal tilt, and thereby the vehicle theft detection system may erroneously determine that the vehicle is stolen.

SUMMARY OF THE INVENTION

The present invention addresses the above disadvantage. Thus, it is an objective of the present invention to provide a vehicle theft detection system, which can more reliably limit an erroneous detection of a stealing of a vehicle.

To achieve the objective of the present invention, there is provided a vehicle theft detection system that is provided in a vehicle. The vehicle theft detection system includes at least two types of sensors, a sensor signal obtaining means, an initial value setting means, a comparing means and a determining means. The at least two types of sensors sense a behavior of the vehicle in a parked state and outputs a corresponding sensor signal that indicates the sensed behavior of the vehicle in the parked state. The sensor signal obtaining means is for obtaining the sensor signal from each of the at least two types of sensors. The initial value setting means is for setting an initial sensor signal of each of the at least two types of sensors, which is initially obtained by the sensor signal obtaining means upon parking of the vehicle, as an initial value of the sensor. The comparing means is for comparing each initial value, which is set by the initial value setting means, with a current sensor signal of a corresponding one of the at least two types of sensors, which is currently obtained by the sensor signal obtaining means. The determining means is for determining whether the vehicle is stolen based on a comparison result, which is made by the comparing means.

BRIEF DESCRIPTION OF THE DRAWINGS

The invention, together with additional objectives, features and advantages thereof, will be best understood from the following description, the appended claims and the accompanying drawings in which:

FIG. 1 is a block diagram showing a structure of a vehicle theft detection system according to a first embodiment of the present invention;

FIG. 3 is a descriptive diagram showing a spring and a piston rod of a shock absorber, which constitute a part of a suspension according to the first embodiment;

FIG. 12 is a flowchart showing a vehicle theft detection process executed by the vehicle theft detection system of the third embodiment;

DETAILED DESCRIPTION OF THE INVENTION

First Embodiment

Figure 2:
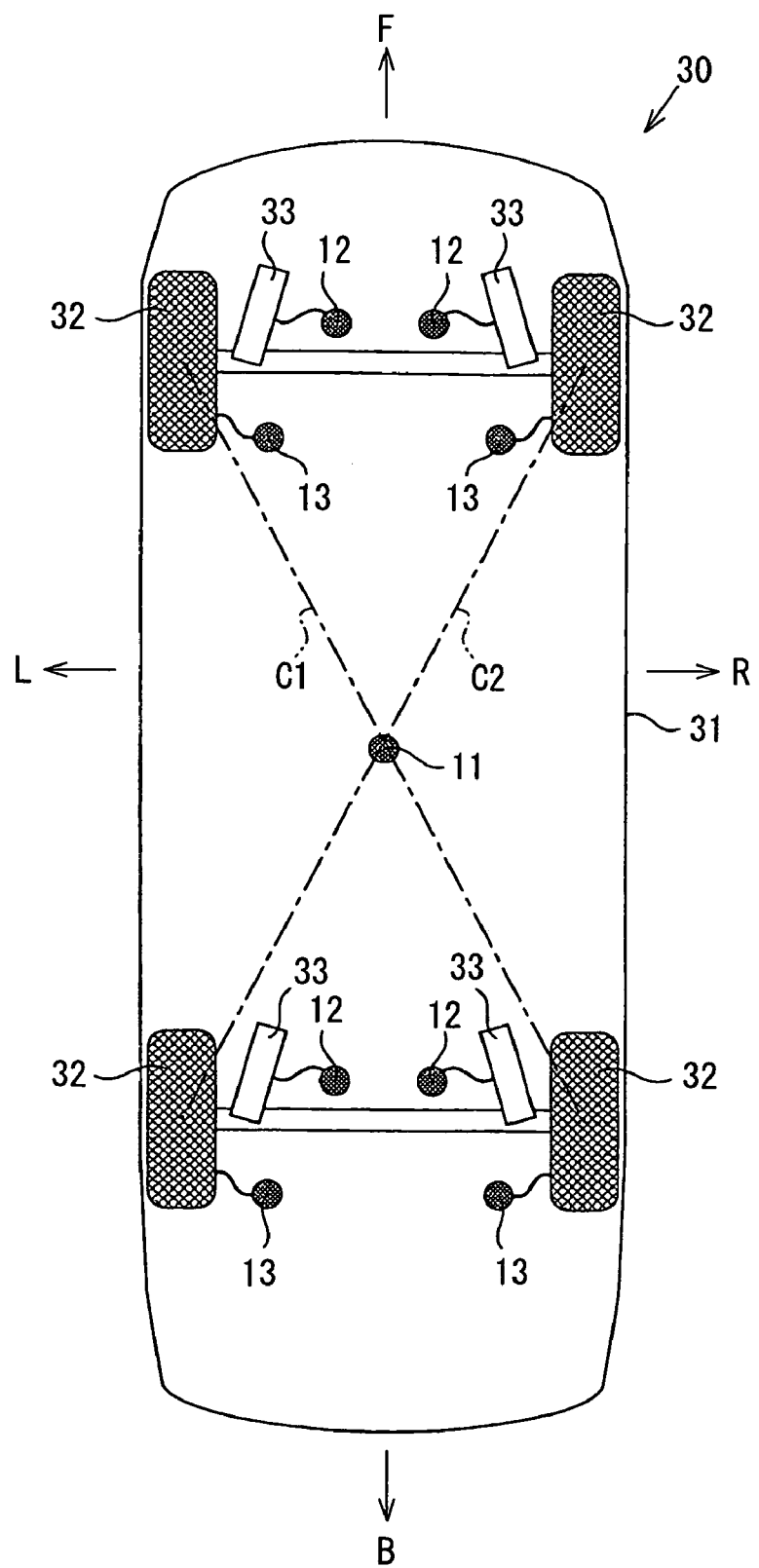
FIG. 2 is a descriptive diagram showing positions of a tilt sensor, of height sensors and of tire pressure sensors according to the first embodiment.
Figure 4:
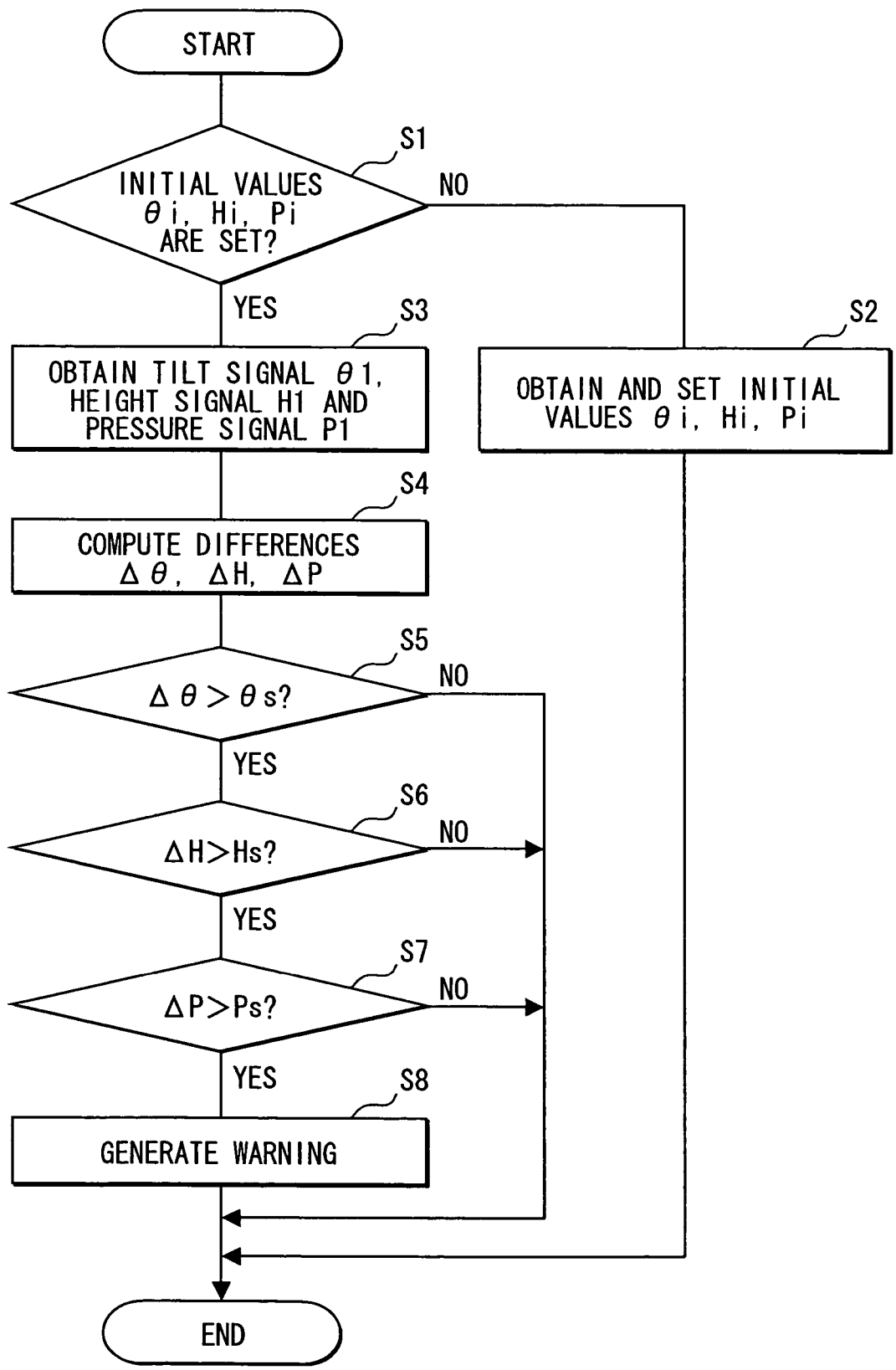
FIG. 4 is a flowchart showing a vehicle theft detection process executed by the vehicle theft detection system according to the first embodiment.
Figure 5:
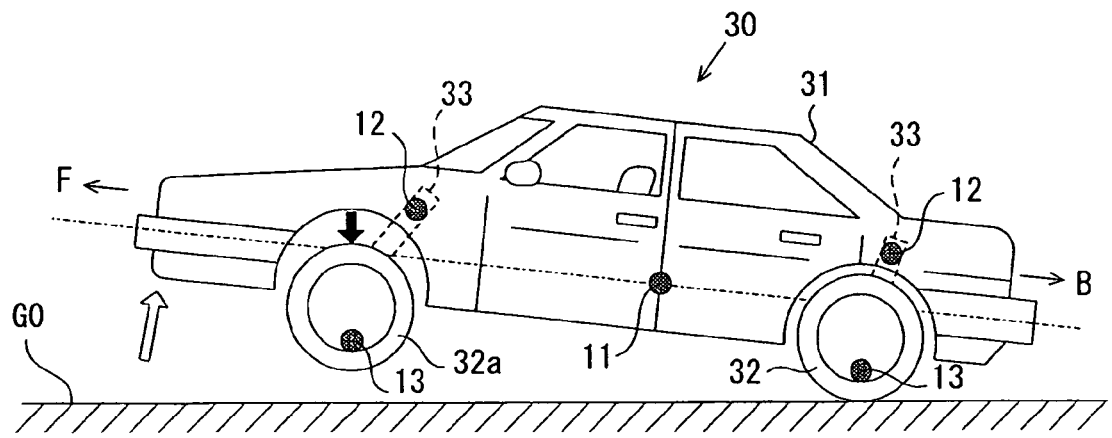
FIG. 5 is a descriptive diagram showing a vehicle, a front side of which is lifted by a wrecker according to the first embodiment.
Figure 6:
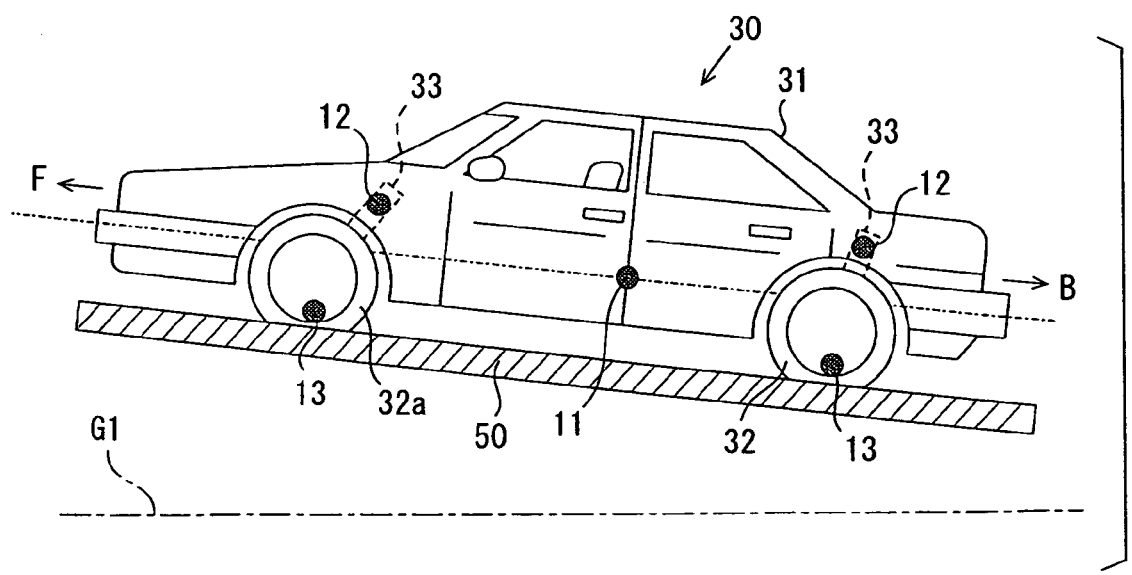
FIG. 6 is a descriptive diagram showing a vehicle that is tilted together with a pallet, which carries the vehicle, in a multilevel parking facility according to the first embodiment.

A vehicle theft detection system according to a first embodiment of the present invention will be described with reference to the accompanying drawings. FIG. 1 is a block diagram showing a structure of the vehicle theft detection system. FIG. 2 is a descriptive diagram showing positions of a tilt sensor, of height sensors and of tire pressure sensors. FIG. 3 is a descriptive diagram showing a spring and a piston rod of a shock absorber, which constitute a part of a suspension. FIG. 4 is a flowchart showing a vehicle theft detection process executed by the vehicle theft detection system. FIG. 5 is a descriptive diagram showing a vehicle, a front side of which is lifted by a wrecker. FIG. 6 is a descriptive diagram showing a vehicle that is tilted together with a pallet, which carries the vehicle, in a multilevel parking facility.

As shown in FIG. 1, the vehicle theft detection system 1 of the first embodiment includes the tilt sensor 11, the height sensors 12, the tire pressure sensors 13 and a control unit 20. The control unit 20 processes data received from these sensors 11-13.

The control unit 20 is a control apparatus, which includes a CPU (not shown) as its main component and also includes memories (e.g., a ROM, a RAM) and input/output interfaces (not shown). The tilt sensor 11, the height sensors 12 and the tire pressure sensors 13 are electrically connected to an input port of the control unit 20.

The control unit 20 includes a sensor signal obtaining section 21, an initial value setting section 22, a comparing section 23, a determining section 24 and a warning section 25. The sensor signal obtaining section 21 obtains sensor signals outputted from the above sensors (the tilt sensor 11, the height sensors 12, the tire pressure sensors 13). The initial value setting section 22 sets an initial sensor signal of each sensor 11-13, which is obtained initially from the sensor signal obtaining section 21 upon parking of a vehicle 30 (FIG. 2), as an initial value of that sensor 11-13. The vehicle includes a vehicle body 31, a plurality of tires 32, and a plurality of springs 33. The comparing section 23 compares each initial value of the sensor 11-13, which is set by the initial value setting section 22, with the corresponding current sensor signal of the sensor 11-13, which is currently obtained by the sensor signal obtaining section 21. The determining section 24 determines whether the vehicle 30 is stolen based on the comparison result made by the comparing section 23. Based on the determination result made by the determining section 24, the warning section 25 may honk a horn or may generate a corresponding warning, which may be in a form of a notification to, for example, a cellular phone to provide information about the stealing of the vehicle.

Next, the tilt sensor 11, the height sensors 12 and the tire pressure sensors 13 will be described in greater detail. FIG. 2 is the descriptive diagram, which shows the positions of the tilt sensor 11, of the height sensors 12 and of the tire pressure sensors 13 as viewed from the top side of the vehicle. Furthermore, arrows F, B, L and R in FIG. 2 indicate a front direction, a back direction, a left direction and a right direction, respectively, of the vehicle 30.

The tilt sensor 11 senses a tilt of the vehicle 30 based on a change in an acceleration, which is generated in the vehicle 30, and outputs an angle signal θ, which is based on the sensed tilt of the vehicle 30. Furthermore, the tilt sensor 11 is provided in an interior of a center console (not shown) that is provided around an intersection between a diagonal direction (a diagonal line) C1, which extends over a front left tire 32 and a rear right tire 32, and a diagonal direction (a diagonal line) C2, which extends over a front right tire 32 and a rear left tire 32 (FIG. 5). With the above construction, the tilt in the front-to-back direction of the vehicle and in the transverse direction (the left-to-right direction) of the vehicle can be sensed in a good balance.

With reference to FIG. 3, each height sensor 12 is formed as a sensor that senses a height of the vehicle based on an amount of stroke of at least one of a piston rod 33b and a spring 33c, which are provided in a shock absorber 33a of a corresponding suspension 33 of the vehicle 30. For example, the amount of stroke may be sensed with a laser displacement meter (not shown), and the height signal H, which corresponds to a distance between a vehicle body 31 and the corresponding tire 32, may be outputted based on the sensed amount of stroke. As shown in FIG. 2, the height sensors 12 are provided to the suspensions 33, respectively, of the vehicle 30.

Alternatively, each height sensor 12 may be formed as a sensor that senses a distance between the vehicle body 31 and a contact plane G0 at which the tire 32 contacts the ground.

Each tire pressure sensor 13 may be provided to a wheel of the corresponding tire 32 and measures an air pressure of the corresponding tire 32 and outputs a pressure signal P based on the measured air pressure. The tire pressure sensors 13 are provided to the tires 32, respectively.

When each height sensor 12 and each tire pressure sensor 13 are provided to the corresponding suspension 33 and the corresponding tire 32, respectively, a change of the sensor signal, which corresponds to a change of the tilt of the vehicle 30 in any of the front, back, left and right directions, can be effectively sensed. Thus, the posture of the vehicle 30 can be more accurately sensed to improve the sensing accuracy of the vehicle theft detection system 1. Furthermore, the above construction may provide a redundant sensor system in the vehicle theft detection system 1, so that even when one of the sensors fails, the remaining normal sensors can still output the corresponding reliable sensor signal. As a result, a reliability of the vehicle theft detection system 1 can be improved.

Next, a vehicle theft detection process (also referred to as a vehicle theft determination process), which is executed by the vehicle theft detection system, will be described with reference to FIG. 4. The vehicle theft detection process is executed by the control unit 20 of FIG. 1 at predetermined time intervals after, for example, turning off of an ignition switch of the vehicle 30.

First, in the control unit 20, it is determined whether the initial value $\theta i$ of the angle signal $\theta$ initially outputted from the tilt sensor 11, the initial value Hi of the height signal H initially outputted from the height sensor 12, and the initial value Pi of the pressure signal P initially outputted from the tire pressure sensor 13 are all obtained by the sensor signal obtaining section 21 (FIG. 1) upon parking (upon turning off of the ignition switch) of the vehicle at step S1.

When it is determined that the initial values $\theta i$, Hi, Pi of the angle signal (the tilt signal) $\theta$, of the height signal H and of the pressure signal P are not obtained at step S1 (i.e., NO at step S1), control proceeds to step S2. At step S2, the angle signal $\theta$ initially outputted from the tilt sensor 11, the height signal H initially outputted from the height sensor 12 and the pressure signal P initially outputted from the tire pressure sensor 13 are obtained and are set as initial values $\theta i$, Hi, Pi, respectively. This step S2 is executed by the initial value setting section 22. After the execution of step S2, the present vehicle theft detection process is terminated.

In contrast, when it is determined that the initial values $\theta i$, Hi, Pi of the angle signal $\theta$, of the height signal H and of the pressure signal P are obtained at step S1 (i.e., YES at step S1), the current angle signal $\theta 1$, the current height signal H1 and the current pressure signal P1 are obtained at step S3.

Then, at step S4, the current angle signal $\theta 1$, the current height signal H1 and the current pressure signal P1 obtained at step S3 are compared with the initial values $\theta i$, Hi, Pi, respectively, obtained at step S2. This step S4 is executed by the comparing section 23. The comparing section 23 executes step 54 by computing a difference $\Delta \theta$ between the current angle signal $\theta 1$ and its initial value $\theta i$, a difference $\Delta H$ between the current height signal H1 and its initial value Hi, and a difference $\Delta P$ between the current pressure signal P1 and its initial value Pi. With respect to the height signal H, the difference $\Delta H$ between the current height signal H1 and its initial value Hi is computed for each of the four height sensors 12. Thus, four values may be provided as the difference $\Delta H$. In the first embodiment, the maximum one of these four values is used as the difference $\Delta H$ used in the following determination. Similarly, with respect to the pressure signal P, the $\Delta P$ between the current pressure signal P1 and its initial value Pi is computed for each of the four tire pressure sensors 13. Thus, four values may be provided as the difference $\Delta P$, and the maximum one of the four values is used as the difference $\Delta P$ in the following determination.

Then, the thus obtained differences $\Delta \theta$, $\Delta H$, $\Delta P$ are compared with its corresponding predetermined threshold value at steps S5-S7, respectively. Steps S5-S7 are executed by the determining section 24.

First, it is determined whether the difference $\Delta \theta$ of the angle signal $\theta$ exceeds the threshold value $\theta s$ (i.e., $\Delta \theta > \theta s$) at step S5. When it is determined that the difference $\Delta \theta$ of the angle signal $\theta$ exceeds the threshold value $\theta s$ at step S5 (i.e., YES at step S5), control proceeds to step S6. At step S6, it is determined whether the difference $\Delta H$ of the height signal H exceeds the threshold value Hs (i.e., $\Delta H > Hs$). When it is determined that the difference $\Delta H$ of the height signal H exceeds the threshold value Hs at step S6 (i.e., YES at step S6), control proceeds to step S7. At step S7, it is determined whether the difference $\Delta P$ of the pressure signal P exceeds the threshold value Ps (i.e., $\Delta P > Ps$). When it is determined that the difference $\Delta P$ of the pressure signal P exceeds the threshold value Ps at step S7 (i.e., YES at step S7), it is then determined that all of the difference $\Delta \theta$ of the angle signal $\theta$, the difference $\Delta H$ of the height signal H and the difference $\Delta P$ of the pressure signal P exceed its threshold value $\theta s$, Hs, Ps. As a result, it is determined that the vehicle 30 is stolen. In this case, the warning is generated at step S8, and the current vehicle theft detection process is terminated. Step S8 is executed by the warning section 25.

In contrast, when any one of the difference $\Delta \theta$ of the angle signal $\theta$, the difference $\Delta H$ of the height signal H and the difference $\Delta P$ of the pressure signal P does not exceed its threshold value $\theta s$, Hs, Ps (i.e., NO at step S5, NO at step S6 or NO at step S7), it is determined that the vehicle 30 has not been stolen. Thus, the current vehicle theft detection process is terminated without generating the warning.

At the above steps S5-S7, when all of the difference $\Delta \theta$ of the angle signal $\theta$, the difference $\Delta H$ of the height signal H and the difference $\Delta P$ of the pressure signal P exceed its threshold value $\theta s$, Hs, Ps, it is determined that the vehicle 30 is stolen. Alternatively, when any two of the difference $\Delta \theta$ of the angle signal $\theta$, the difference $\Delta H$ of the height signal H and the difference $\Delta P$ of the pressure signal P exceed its threshold value $\theta s$, Hs, Ps, it may be determined that the vehicle 30 is stolen.

Next, the vehicle theft detection process will be described in view of a case where one of a front end and a rear end of the vehicle 30 is lifted and towed by, for example, a wrecker without a notification and a case where the vehicle 30 parked on a pallet 50 is tilted together with the pallet 50 in a multi-level parking facility.

As shown in FIG. 5, in the case where the front end (the left end in FIG. 5) of the vehicle 30 is lifted in a direction of a blank arrow in FIG. 5 and is towed in the direction of F by the wrecker, the vehicle 30 is tilted relative to the contact plane G0 at which the tires 32 normally contact the ground, so that the front end of the vehicle 30 is further spaced from the contact plane G0 in comparison to the rear end of the vehicle 30. In this way, the front wheels 32a of the vehicle 30 no longer support the vehicle weight, and thereby the pressure signal P1 of the front wheels 32a is significantly reduced from its initial value Pi, which is measured upon the parking of the vehicle 30.

Furthermore, when the vehicle weight is removed from the front suspensions 33, the front suspensions 33 are pulled downward in the vertical direction (the direction indicated by a solid arrow in FIG. 5) by the weight of the lifted front wheels 32a. Thus, the height signal H1, which is sensed by the height sensors 12, significantly changes from its initial value Hi.

Therefore, all of the results of the determinations made by the determining section 24 at steps S5-S7 become YES. As a result, it is determined that the vehicle 30 is stolen.

This is also true in a case where the rear end of the vehicle 30 is lifted and is towed in the direction of B by, for example, the wrecker without a notification.

In contrast, as shown in FIG. 6, in the case where the vehicle 30, which is parked on the pallet 50 in the multilevel parking facility, is tilted together with the pallet 50 relative to a horizontal plane G1 in such a manner that the front end of the vehicle 30 is further spaced from the horizontal plane G1 in comparison to the rear end of the vehicle 30, the vehicle 30 may be tilted in the amount that is the same as the above case where the front end of the vehicle 30 is lifted by the wrecker (see FIG. 5). In such an instance, unlike the case where the front end of the vehicle 30 is lifted by the wrecker, the front wheels 32a of the vehicle 30 parked on the pallet 50 still support the vehicle weight, and therefore the height signal H1 and the pressure signal P1 do not change substantially from its initial value. Therefore, among the results of the determinations made by the determining section 24 at steps S5-S7 of FIG. 4, only the result of the determination made at step S5 becomes YES. As a result, it is determined that the vehicle 30 has not been stolen.

That is, in the case where the tilt of the parked vehicle 30 occurs due to the reason(s) other than the stealing of the vehicle 30, the prior art vehicle theft detection system, which has only the tilt sensor, cannot distinguish the stealing of the vehicle 30 from the other incident(s) caused by the reason(s) other than the stealing of the vehicle. However, according to the present invention, the sensor signal of the tilt sensor 11 is combined with the sensor signals of the other sensors, which can sense the change in the state of the vehicle at the time of tilting the vehicle 30. Thus, the tilted state of the vehicle 30 can be sensed in the greater detail. As a result, the change in the tilt of the vehicle 30 caused by the stealing of the vehicle 30 can be distinguished from the change in the tilt of the vehicle 30 caused by the other reason(s) other than the stealing of the vehicle 30. Therefore, an erroneous detection of the stealing of the vehicle 30 can be avoided.

Now, advantages of the first embodiment will be described.

(1) As described above, according to the first embodiment, the movement (the behavior) of the parked vehicle 30 can be sensed by the tilt sensor 11, the height sensors 12 and the tire pressure sensors 13. Thus, according to the first embodiment, the mistakable movement of the vehicle 30, which could be otherwise misinterpreted as the stealing of the vehicle 30 by the prior art vehicle theft detection system that has only the tilt sensor, can be effectively sensed upon distinguishing such a mistakable movement of the vehicle 30 from the stealing movement of the vehicle 30, which is caused by the stealing of the vehicle 30.

That is, according to the first embodiment, there is implemented the vehicle theft detection system 1, which can limit the erroneous detection.

(2) The stealing of the vehicle 30 is determined through the comparison of the difference $\Delta\theta$, $\Delta H$, $\Delta P$ of each sensor signal $\theta$, H, P with its threshold value $\theta s$, Hs, Ps, so that the stealing of the vehicle 30 can be easily determined. Furthermore, by appropriately setting the threshold values $\theta s$, Hs, Ps, the accuracy of the determination of the stealing can be improved.

Second Embodiment

Figure 8:
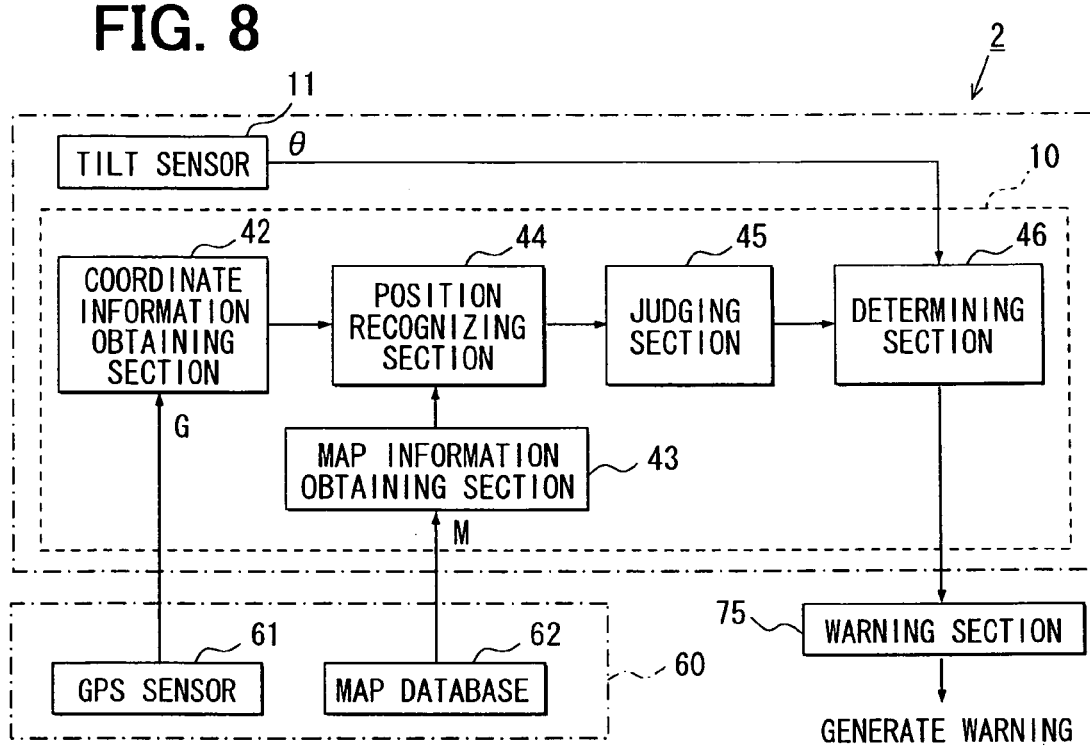
FIG. 8 is a block diagram showing a structure of the vehicle theft detection system according to a second embodiment of the present invention.
Figure 9:
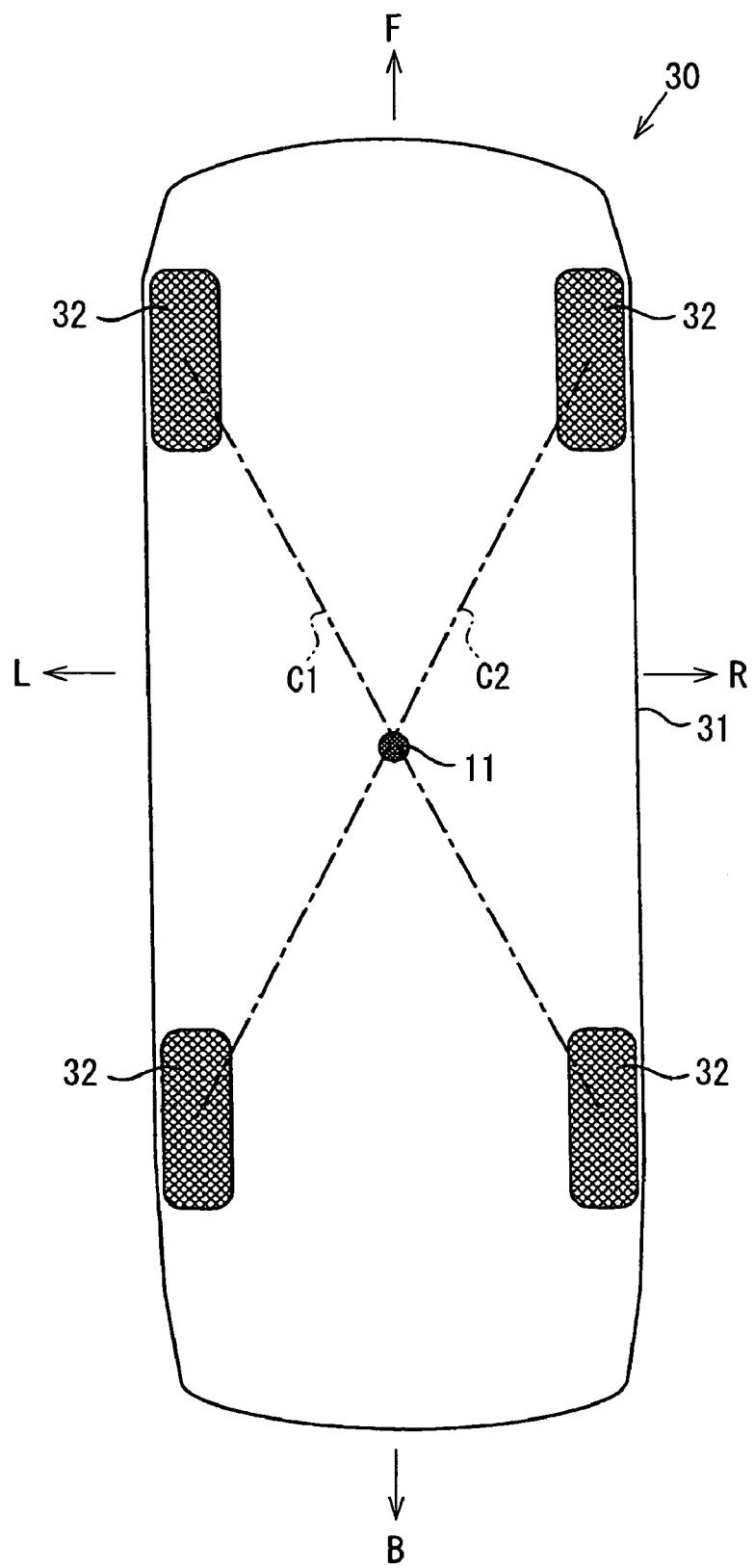
FIG. 9 is a descriptive diagram showing a position of a tilt sensor according to the second embodiment.
Figure 10:
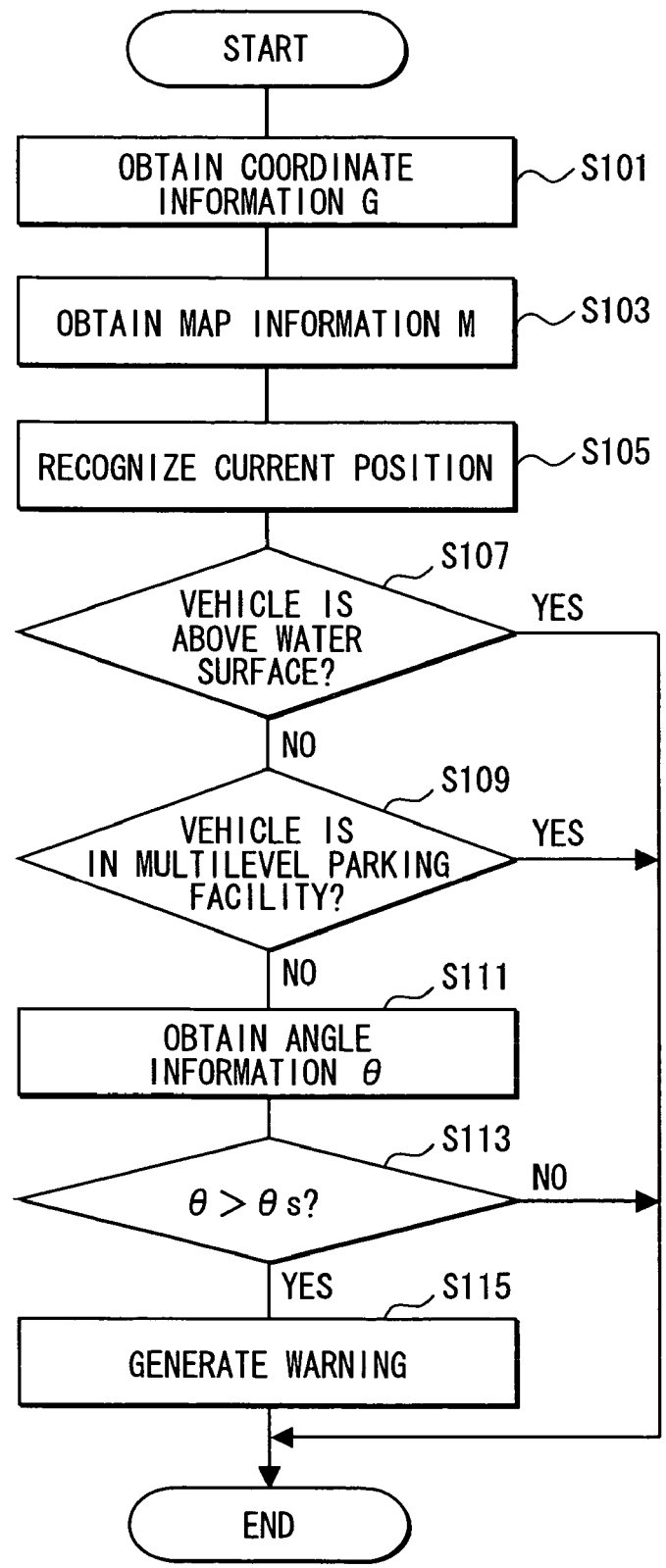
FIG. 10 is a flowchart showing a vehicle theft detection process executed by the vehicle theft detection system according to the second embodiment.

A vehicle theft detection system according to a second embodiment of the present invention will be described with reference to FIGS. 8 to 10. FIG. 8 is a block diagram showing a structure of the vehicle theft detection system of the second embodiment. FIG. 9 is a descriptive diagram showing a position of a tilt sensor. FIG. 10 is a flowchart showing a vehicle theft detection process executed by the vehicle theft detection system according to the second embodiment. In FIG. 9, directions of arrows F, B, L, R correspond to a front direction (F), a back direction (B), a left direction (L) and a right direction (R), respectively, of a vehicle 30.

As shown in FIG. 8, the vehicle theft detection system 2 of the second embodiment includes a tilt sensor 11 and a control unit 10. The tilt sensor 11 senses a tilt of the vehicle 30 (FIG. 9) and outputs angle information (information indicating a measured tilt angle) $\theta$, which is based on the sensed tilt of the vehicle 30. The control unit 10 processes data, which is outputted from the tilt sensor 11, and information, which is obtained by a navigation apparatus 60 described below.

The control unit 10 is a control apparatus, which includes a CPU (not shown) as its main component and also includes memories (e.g., a ROM, a RAM) and input/output interfaces (e.g., an A/D converter). The tilt sensor 11 is electrically connected to an input port of the input interface of the control unit 10. The memory (not shown) of the control unit 10 previously stores programs, which function as a map information obtaining section 43, a position recognizing section 44, a judging section 45 and a determining section 46.

The tilt sensor 11 senses a tilt of the vehicle 30 based on a change in a horizontal acceleration component, which is generated in the vehicle 30, and outputs angle information $\theta$, which is based on the sensed tilt of the vehicle 30. The tilt sensor 11 may be a gravity (G) sensor (an acceleration sensor). In the second embodiment, the tilt sensor 11 is provided below a center console (not shown) that is arranged around an intersection between a diagonal direction (a diagonal line) C1, which extends over a front left tire 32 and a rear right tire 32, and a diagonal direction (a diagonal line) C2, which extends over a front right tire 32 and a rear left tire 32 (FIG. 9).

A coordinate information obtaining section 42 obtains a current position of the vehicle 30 from a GPS sensor 61 of the navigation apparatus 60 described below.

The map information obtaining section 43 obtains map information M from a map database 62 of the navigation apparatus 60.

According to the map information M, which is obtained by the map information obtaining section 43, and the coordinate information G, which is obtained by the coordinate information obtaining section 42, the position recognizing section 44 recognizes the current position of the vehicle 30 as a position of the vehicle 30 on a map, which is generated based the map information M.

The judging section 45 judges whether the position of the vehicle 30 on the map recognized by the position recognizing section 44 is in a predetermined position or predetermined range.

In a case where the judging section 45 judges that the position of the vehicle 30 on the map is not in the predetermined position or predetermined range, the determining section 46 determines whether the vehicle 30 is stolen based on the angle information $\theta$ outputted from the tilt sensor 11.

The vehicle 30 includes a warning section 75 and the navigation apparatus 60. The warning section 75 may honk a horn or may generate a corresponding warning, which may be in a form of a notification to, for example, a cellular phone to provide information about the stealing of the vehicle 30. The navigation apparatus 60 searches a route from the current position of the vehicle 30 to a preset destination and guides the vehicle 30 along the route to the destination. The navigation apparatus 60 has a communication function (a communication device). Thus, the warning, which is generated from the warning section 75, can be transferred to a security center through the navigation apparatus 60 to send the warning to, for example, the cellular phone of the user.

Here, the vehicle theft detection system 2 and the warning section 75 cooperate together to form a vehicle theft prevention system. Alternatively, the vehicle theft detection system 2 may include the warning section 75 to serve as the vehicle theft prevention system.

The navigation apparatus 60 includes the GPS sensor 61 and the map database 62 that stores the map information M. The GPS sensor 61 includes a GPS receiver, which receives GPS signals from a plurality of GPS satellites, to determine an absolute position of the user (the vehicle 30), so that the GPS sensor 61 can output the current position of the vehicle 30 as the coordinate information G, which indicates a longitude and a latitude of the current position of vehicle 30.

The map database 62 stores the map information M, which includes attribute information N. The attribute information N includes various attributes, such as an attribute of a parking facility. A communication protocol is set in the attribute information N to allow transmission of the attribute information upon digitizing the attribute information. In the digitizing of the attribute information, for example, a water surface may be indicated by "N=1", and a pallet type multilevel parking facility may be indicated by "N=2", and others may be indicated by "N=3". With the above construction, the map information obtaining section 43 can obtain the map information M from the map database 62 of the navigation apparatus 60. Thus, it is not required to separately provide a dedicated map information database, thereby allowing minimization of the costs.

Next, a vehicle theft detection process (also referred to as a vehicle theft determination process), which is executed by the vehicle theft detection system, will be described with reference to FIG. 10. The vehicle theft detection process is executed by the control unit 10 of FIG. 8 at predetermined time intervals after, for example, turning off of an ignition switch of the vehicle 30.

First, in the vehicle theft detection process, at step S101, the longitude and the latitude of the current position of the vehicle 30 outputted from the GPS sensor 61 of the navigation apparatus 60 are obtained as coordinate information G. This step S101 is executed by the coordinate information obtaining section 42.

Next, control proceeds to step S103. At step S103, the map information M is obtained from the map database 62 of the navigation apparatus 60. This step S103 is executed by the map information obtaining section 43.

Next, at step S105, according to the map information M, which is obtained by the map information obtaining section 43, and the coordinate information G, which is obtained by the coordinate information obtaining section 42, the current position of the vehicle 30 is recognized as a position or range of the vehicle 30 on a map, which is formed based on the map information M, and then the attribute information N is set. This step 105 is executed by the position recognizing section 44. In this step, for instance, a virtual map may be formed in a memory space (not shown), which constitutes a part of the control unit 10, based on the map information M. Through map matching between the coordinate information G and the map information M, the position or the range of the vehicle 30 on the map may be recognized.

Then, at steps S107, S109, it is determined whether the current position of the vehicle 30 on the map is in a predetermined position or predetermined range. Specifically, for instance, it is determined whether the current position of the vehicle 30 on the map is above a water surface in a case where the vehicle is transported by a ferry along the sea. Also, it is determined whether the current position of the vehicle 30 on the map is in the pallet type multilevel parking facility. These steps S107, S109 are executed by the judging section 45.

First, at step S107, it is determined whether the current position of the vehicle 30 on the map is above the water surface (i.e., N=1). When it is determined that the current position of the vehicle 30 on the map is not above the water surface (i.e., N≠1) at step S107 (i.e., NO at step S107), control proceeds to step S109. At step S109, it is determined whether the current position of the vehicle 30 on the map is in the multilevel parking facility (i.e., N=2). When it is determined that the current position of the vehicle 30 on the map is not in the multilevel parking facility (i.e., N≠2) at step S109 (i.e., NO at step S109), the vehicle 30 is in the other position or range (N=3), which is other than the water surface and the multilevel parking facility. Therefore, it is determined that the vehicle 30 is out of "the predetermined position or range".

When it is determined that the vehicle 30 is not in the multilevel parking facility at step S109 (i.e., NO at step S109), control proceeds to step S111. At step S111, angle information θ, which is outputted from the tilt sensor 11, is obtained. Then, at step S113, it is determined whether the angle information θ is larger than a preset threshold value θs (i.e., θ>θs).

When it is determined that the angle information θ is larger than the threshold value θs at step S113 (i.e., YES at step S113), the vehicle 30 is out of the water surface and the multilevel parking facility (the predetermined position or range), and the angle information θ is larger than the threshold value θs. Therefore, it is determined that the vehicle 30 is stolen. The above steps S11, S113 are executed by the determining section 46. In this case (i.e., YES at step S113), the warning is generated at step S115, and the current vehicle theft detection process is terminated. This step S115 is executed by the warning section 75.

In contrast, when it is determined that the vehicle is above the water surface or in the multilevel parking facility (in the predetermined position or range) (i.e., YES at step S107 or YES at step S109), it is then determined that the current condition does not correspond to the stealing of the vehicle, and thereby the current vehicle theft detection process is terminated.

Furthermore, when the angle information θ is not greater than the threshold value θs (i.e., NO at step S113), the abnormal tilt of the vehicle (e.g., a tilt of the vehicle at the time of towing the vehicle 30 by a wrecker without a notification) is not sensed. Thus, it is determined that the vehicle 30 is not stolen, and the current vehicle theft detection process is terminated without generating a warning.

Now, advantages of the second embodiment will be described.

As described above, according to the second embodiment, in the case where the vehicle 30 is above the water surface or in the pallet type multilevel parking facility, even when the vehicle 30 is tilted, the tilting of the vehicle is not caused by the stealing of the vehicle 30. Thus, the determining section 46 does not determine whether the vehicle 30 is stolen, and thereby an erroneous detection of the stealing of the vehicle 30 will not occur. Furthermore, the user is not required to set the vehicle theft detection system 2 in "the multilevel parking mode". Thus, it is possible to avoid the erroneous detection of the stealing of the vehicle, which is caused by forgetting of the setting of "the multilevel parking mode".

Specifically, there is implemented the vehicle theft detection system 2, which can limit the erroneous detection of the stealing of the vehicle 30.

Furthermore, the warning section 75 allows the notification of the stealing of the vehicle to the user or people around the vehicle. Therefore, the vehicle theft prevention system can be implemented through the combination of the warning section 75 and the vehicle theft detection system 2.

Third Embodiment

A vehicle theft detection system according to a third embodiment of the present invention will be described with reference to FIGS. 11 to 12. The vehicle theft detection system of the third embodiment differs from the vehicle theft detection system of the second embodiment in the following two points. First, map information M' of the vehicle theft detection system of the third embodiment does not include the attribute of the parking facility, which distinguishes between the pallet type multilevel parking facility and the other drive-in parking facilities (i.e., other types of drive-in parking facilities). Secondly, the vehicle theft detection system of the third embodiment further includes a movement sensor 17. Therefore, in the following description, the components similar to those of the second embodiment will be indicated by the same numerals and will not be described further.

Figure 11:
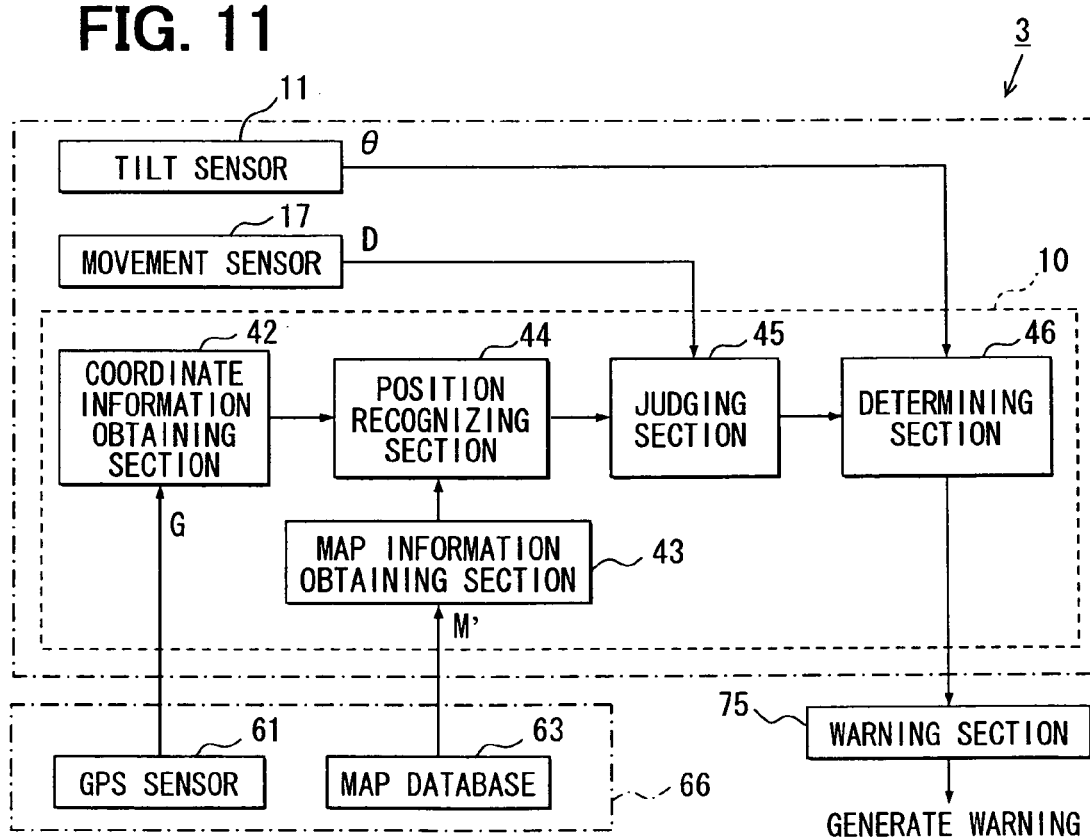
FIG. 11 is a block diagram showing a structure of a vehicle theft detection system according to a third embodiment of the present invention.

FIG. 11 is a block diagram showing a structure of the vehicle theft detection system according to the third embodiment. FIG. 12 is a flowchart showing a vehicle theft detection process executed by the vehicle theft detection system according to the third embodiment.

As shown in FIG. 11, the vehicle theft detection system 3 of the third embodiment includes the movement sensor 17 in addition to the components of the vehicle theft detection system 2 of the second embodiment.

The movement sensor 17 detects movement of the vehicle 30 in an upward direction or a downward direction of the vehicle 30 based on a change in an acceleration generated in the vehicle 30 and outputs a movement signal D based on the detected movement of the vehicle 30. The movement sensor 17 is electrically connected to the judging section 45 (the input port) of the control unit 10. The movement sensor 17 is positioned adjacent to the tilt sensor 11. The judging section 45 judges whether the current position of the vehicle 30 on the map is in the pallet type multilevel parking facility based on the movement information D, which is outputted from the movement sensor 17.

The map database 63 of the navigation apparatus 66 stores the map information M'. The map information M' of the third embodiment is similar to the map information M of the second embodiment except the following point. That is, the map information M' does not include the attribute of the parking facility, which distinguishes between the pallet type multilevel parking facility and the other drive-in parking facilities, and thereby the parking facilities, which include the pallet type multilevel parking facility and the other drive-in parking facilities, are all indicated by "N=2" in the third embodiment.

Next, a vehicle theft detection process (also referred to as a vehicle theft determination process), which is executed by the vehicle theft detection system, will be described with reference to FIG. 12. Steps S101-S107 and S111-S115 of the third embodiment are the same as those of the second embodiment and will not be described further. The following steps S201-S205 are executed by the judging section 45.

At step S201, which is executed after step S107, it is determined whether the vehicle 30 is in the parking facility (i.e., N=2). When it is determined that the vehicle 30 is in the parking facility (i.e., N=2) at step S201 (i.e., YES at step S201), control proceeds to step S203. At step S203, the movement signal D (movement information) D, which is outputted from the movement sensor 17, is obtained. Then, at step S205, it is determined whether the movement signal D is equal to or smaller than a preset threshold value Ds (i.e., D≦Ds).

When it is determined that the movement signal D is equal to or smaller than the threshold value (D≦Ds) at step S205, movement of the vehicle 30 in the upward direction or downward direction does not exist. Thus, it is determined that the vehicle 30 is parked in the drive-in parking facility other than the multilevel parking facility. Therefore, when it is determined that the movement signal D is equal to or smaller than the threshold value Ds (i.e., YES at step S205), the vehicle 30 is parked in the drive-in parking facility other than the multilevel parking facility. As a result, it is determined that the vehicle 30 is out of "the predetermined position or range", and control proceeds to step S111. Furthermore, when it is determined that the vehicle 30 is not in the parking facility (i.e., N≠2) at step S201 (i.e., NO at step S201), control proceeds to step S111.

In contrast, when it is determined that the movement signal D is larger than the threshold value Ds at step S205 (i.e., NO at step S205), the vehicle 30 is moved in the upward direction or downward direction, so that the vehicle 30 is in the pallet type multilevel parking facility. Thus, it is determined that the vehicle 30 is in "the predetermined position or range", and thereby this condition does not correspond to the stealing of the vehicle even if the vehicle is tilted beyond the threshold value θs. Therefore, the current vehicle theft detection process is terminated.

Now, advantages of the third embodiment will be described.

The vehicle theft detection system 3 includes the movement sensor 17, which detects movement of the vehicle 30 in the upward direction or downward direction and outputs the movement information D based on the detected movement of the vehicle 30. Thus, it is possible to detect the movement of the vehicle 30 in the upward direction or downward direction upon parking of the vehicle 30.

Therefore, even in the case where the map information M' does not include the attribute of the parking, which distinguishes between the pallet type multilevel parking facility and the other drive-in parking facilities, the presence of the vehicle 30 in the pallet type multilevel parking facility can be identified by the judging section 45 when the vehicle 30 is determined to be in the parking facility and is determined to be moved upward direction or downward direction beyond the threshold value Ds. When the vehicle 30 is determined to be in the parking facility and is determined to be not moving in the upward direction or the downward direction beyond the threshold value Ds, the judging section 45 can determine that the vehicle 30 is in the drive-in parking facility other than the multilevel parking facility.

Fourth Embodiment

Figure 13:
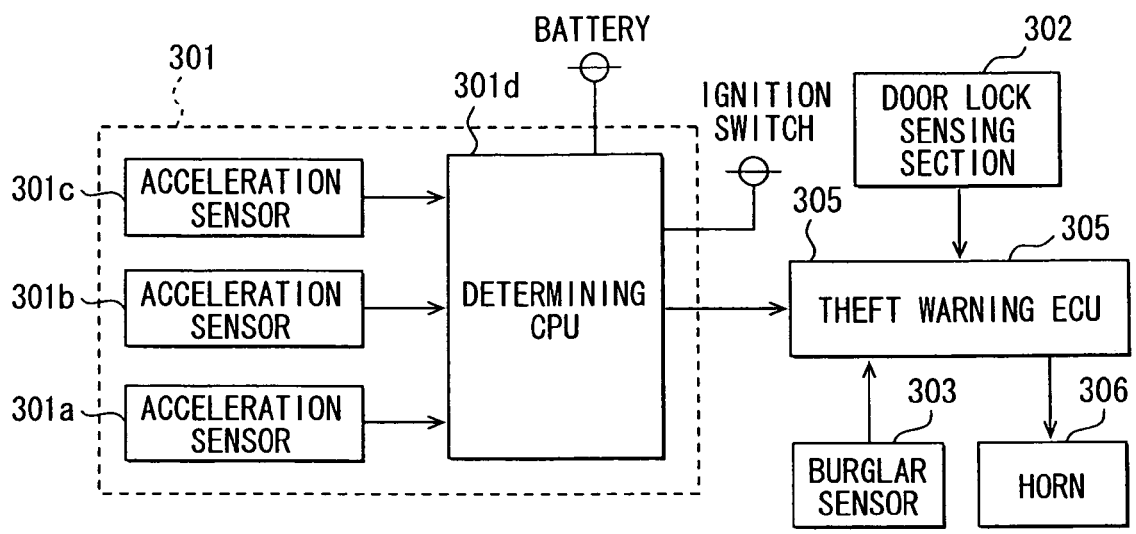
FIG. 13 is a block diagram showing a structure of a vehicle theft prevention system according to a fourth embodiment of the present invention.

A fourth embodiment of the present invention will be described with reference to FIGS. 13 to 15. FIG. 13 is a block diagram showing a structure of a vehicle theft prevention system (or a vehicle theft detection system) of the fourth embodiment.

As shown in FIG. 13, the vehicle theft prevention system (the vehicle theft detection system) includes a tilt sensor 301, a door lock sensing section 302, a burglar sensor (a theft sensor) 303, a theft warning ECU 305 and a horn 306.

The tilt sensor 301 includes three acceleration sensors 301a-301c and a determining CPU 301d. Two of the three acceleration sensors 301a-301c are used to sense accelerations of a vehicle in two directions, which are perpendicular to each other in a horizontal plane of the vehicle, i.e., to sense an acceleration in a front-to-back direction of the vehicle and an acceleration in a left-to-right direction of the vehicle. A remaining one of the three acceleration sensors 301a-301c is used to sense an acceleration in a top-to-bottom direction (a vertical direction or an upward-to-downward direction) of the vehicle.

Figure 14:
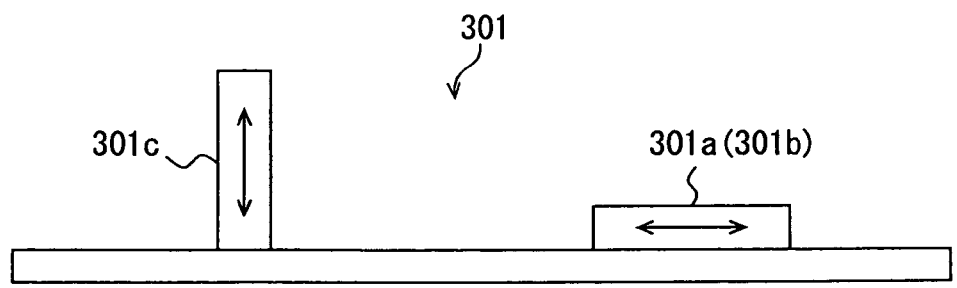
FIG. 14 is a schematic side view showing a tilt sensor of the vehicle theft prevention system shown in FIG. 13.

FIG. 14 is a schematic side view of the tilt sensor 301. As indicated by arrows in FIG. 14, the acceleration sensor 301a senses the acceleration in the front-to-back direction of the vehicle, and the acceleration sensor 301c senses the acceleration in the vertical direction. The acceleration sensor 301b is not indicated in FIG. 14 since the acceleration sensor 301b is hidden by the acceleration sensor 301a. However, it should be noted that the acceleration sensor 301b senses the acceleration in the left-to-right direction (a direction perpendicular to a plane of FIG. 14) of the vehicle.

Thus, the acceleration sensor 301a can be used to sense movement of the vehicle in the front-to-back direction, and the acceleration sensor 301b can be used to sense movement of the vehicle in the left-to-right direction of the vehicle. Furthermore, the acceleration sensor 301c can be used to sense movement of the vehicle in the vertical direction.

The determining CPU 301d receives measurement outputs of the acceleration sensors 301a-301c and converts the received measurement outputs from an analog signal to a digital signal through an A/D converter to obtain a physical value of each measured acceleration. Then, the determining CPU 301d computes a change in a tilt angle of the vehicle based on the physical value of the acceleration in the front-to-back direction of the vehicle or in the left-to-right direction of the vehicle, which are obtained from the acceleration sensor 301a or the acceleration sensor 301b. Based on the thus computed change in the tilt angle of the vehicle, the determining CPU 301d determines whether a possibility of stealing of the vehicle through jacking up of the vehicle exists (e.g., a possibility of vehicle theft by towing of the vehicle by a wrecker). Furthermore, the determining CPU 301d also determines whether the vehicle is moved in the vertical direction based on the physical value of the acceleration in the vertical direction of the vehicle, which is obtained based on the measurement output of the acceleration sensor 301c.

That is, when the vehicle is parked on a pallet of a mechanical multilevel parking facility (a pallet type multilevel parking facility), the vehicle may be moved together with the pallet in the vertical direction. For example, the vehicle is moved in the vertical direction in the mechanical multilevel parking facility, such as a vertical circulation parking system, a multi-level circulation parking system, an elevator slide parking system and a two-storied/multi-storied parking system.

In such a case, when the vehicle is moved, the acceleration in the front-to-back direction or in the left-to-right direction of the vehicle may possibly be generated. However, when the acceleration is generated due to the movement of the vehicle in the mechanical multilevel parking facility, the tilting of the vehicle is not caused by the jacking up of the vehicle or the like.

Thus, in the fourth embodiment, in addition to the acceleration sensors 301a, 301b, which sense the acceleration in the horizontal plane (two right angled horizontal directions, respectively) of the vehicle, the acceleration sensor 301c, which senses the acceleration in the vertical direction of the vehicle, is also provided. With this construction, when the acceleration in the horizontal direction of the vehicle occurs, the determining CPU 301d can determine whether the acceleration in the horizontal direction is due to the jacking up of the vehicle or due to the parking of the vehicle in the mechanical multilevel parking facility. When it is determined that the high possibility of the stealing of the vehicle exists, the determining CPU 301d outputs a notifying signal for notifying the possibility of the vehicle theft to the theft warning ECU 305.

A predetermined voltage is applied to the determining CPU 301d when an ignition (IG) switch of the vehicle is turned on. Based on an electric potential (Hi or Low) of a terminal, which is adapted to receive the above voltage, the determining CPU 301d senses an ON or OFF state of the IG switch.

The door lock sensing section 302 senses a locked state and an unlocked state of a door of the vehicle and outputs a door lock signal, which indicates the sensed state of the door. For example, when the door is locked through a remote key of a keyless entry system, the door lock sensing section 302 senses the locked state of the door and informs the state (the locked state) of the door to the theft warning ECU 305. For instance, in a case where a door lock/unlock sense signal or an ON/OFF signal to a door lock actuator (a solenoid) is processed through a body ECU (not shown), the locked/unlocked state of the door can be sensed based on such a signal.

The burglar sensor 303 includes, for example, an infrared sensor and detects intrusion of a burglar into a passenger compartment of the vehicle. Here, the burglar sensor 303 is described as the exemplary sensing means of the vehicle theft prevention system (the vehicle theft detection system), which senses the stealing of the vehicle through the way other than the jacking up of the vehicle. In place of or in addition to the burglar sensor, the vehicle theft prevention system (the vehicle theft detection system) may include a sensor, which senses breaking of a vehicle window glass.

The theft warning ECU 305 monitors and senses the possibility of the stealing of the vehicle based on the signals, which are outputted from the tilt sensor 301, the door lock sensing section 302 and the burglar sensor 303. Then, when it is determined that there is the high possibility of the stealing of the vehicle, the theft warning ECU 305 drives the horn 306.

Specifically, the theft warning ECU 305 receives the door lock signal from the door lock sensing section 302. When the door lock signal indicates that the door is in the locked state, the theft warning ECU 305 outputs a security-on signal to the tilt sensor 301 to initiate monitoring of the stealing of the vehicle. Furthermore, when the door is unlocked after the outputting of the security-on signal, the theft warning ECU 305 outputs a security-off signal to the tilt sensor 301 to stop the monitoring of the stealing of the vehicle.

When the determining CPU 301d of the tilt sensor 301 receives the security-on signal, the determining CPU 301d determines whether the high possibility of the stealing of the vehicle exists based on the measurement outputs of the acceleration sensors 301a-301c to monitor the stealing of the vehicle. Then, when the determining CPU 301d receives the security-off signal, the determining CPU 301d stops the monitoring of the stealing of the vehicle.

Upon receiving of the signal, which indicates the high possibility of stealing of the vehicle, from the tilt sensor 301 and/or receiving of the signal, which indicates the intrusion of the burglar into the passenger compartment, from the burglar sensor 303, the theft warning ECU 305 outputs a drive signal to drive the horn 306.

The horn 306 is driven based on the drive signal of the theft warning ECU 305 and outputs a voice notification (or a sound), which indicates the high possibility of the stealing of the vehicle.

Next, the vehicle theft warning process, which is executed by the vehicle theft prevention system (the vehicle theft detection system), will be described. FIG. 15 shows a flowchart, which indicates the vehicle theft warning process executed by the determining CPU 301d of the tilt sensor 301 at predetermined intervals. The following description is made in view of this flowchart.

First, at step S400, it is determined whether the security-on signal is received. This determination is made based on whether the security-on signal is received (inputted) from the theft warning ECU 305. When it is determined that the security-on signal is received at step S400, control proceeds to step S410. In contrast, when it is determined that the security-on signal is not received (i.e., the security-off signal has been received) at step S400, control repeats step S400 until the security-on signal is received.

At step S410, the measurement outputs of the acceleration sensors 301a-301c are converted through the A/D converter, so that the physical value of the acceleration in the front-to-back direction of the vehicle, the physical value of the acceleration in the left-to-right direction of the vehicle and the physical value of the acceleration in the vertical direction of the vehicle are obtained.

Then, control proceeds to step S420. At step S420, it is determined whether the vehicle is tilted based on the physical value of the acceleration in the front-to-back direction of the vehicle and the physical value of the acceleration in the left-to-right direction of the vehicle, which are obtained at step S410. That is, when the jacking up of the vehicle is performed, the vehicle body is tilted to lift at least one of the four wheels of the vehicle. Thus, it is possible to determine whether the vehicle is tilted based on a change in the physical value of the acceleration in the front-to-back direction of the vehicle and the physical value of the acceleration in the left-to-right direction of the vehicle.

Here, an initial physical value of the acceleration in the front-to-back direction and an initial physical value of the acceleration in the left-to-right direction may be prestored in a memory. Then, it may be determined whether the vehicle is tilted based on a difference between the stored initial physical value of the acceleration in the front-to-back direction and the current physical value of the acceleration in the front-to-back direction and a difference between the stored initial physical value of the acceleration in the left-to-right direction and the current physical value of the acceleration in the left-to-right direction. In this instance, the vehicle body may possibly be simply swung at the time other than the stealing of the vehicle. However, when the vehicle body is simply swung, the physical value of the acceleration in the front-to-back direction or the physical value of the acceleration in the left-to-right direction will finally return to its initial value, so that an integral value of the physical values will become 0 (zero). Therefore, if the integral value of the physical values is checked, the tilt of the vehicle can be more accurately determined.

When NO is returned at step S420, control returns to step S400 to repeat the above operation. In contrast, when YES is returned at step S420, control proceeds to step S430.

At step S430, it is determined whether the acceleration in the vertical direction of the vehicle is changed based on the physical value of the acceleration in the vertical direction of the vehicle, which is obtained at step S410. That is, it is determined whether the vehicle is parked in the mechanical multilevel parking facility based on the acceleration in the vertical direction generated by the vertical movement of the vehicle. When the vehicle is moved in the vertical direction, the physical value of the acceleration in the vertical direction of the vehicle will be changed from the acceleration of gravity ($9.8 \text{ m/s}^2$). Thus, the physical value of the acceleration in the vertical direction of the vehicle is obtained by adding or subtracting the acceleration in the vertical direction relative to the acceleration of gravity ($9.8 \text{ m/s}^2$). Therefore, it is possible to determine whether the vehicle is parked in the mechanical multilevel parking facility based on whether the physical value of the acceleration in the vertical direction of the vehicle is changed.

When YES is returned at step S430, the high possibility of the stealing of the vehicle does not exist, so that control returns to step S400 to repeat the above operation. In contrast, when NO is returned at step S430, the high possibility of the stealing of the vehicle exists, so that control proceeds to step S440.

At step S440, the warning is generated. Specifically, at this step S440, a signal in a form of a warning output, which indicates the high possibility of the stealing of the vehicle, is outputted from the determining CPU 301d. The theft warning ECU 305 receives the warning output and in turn outputs the drive signal to drive the horn 306, so that the horn 306 outputs a warning sound to limit or prevent the stealing of the vehicle.

Figure 16:
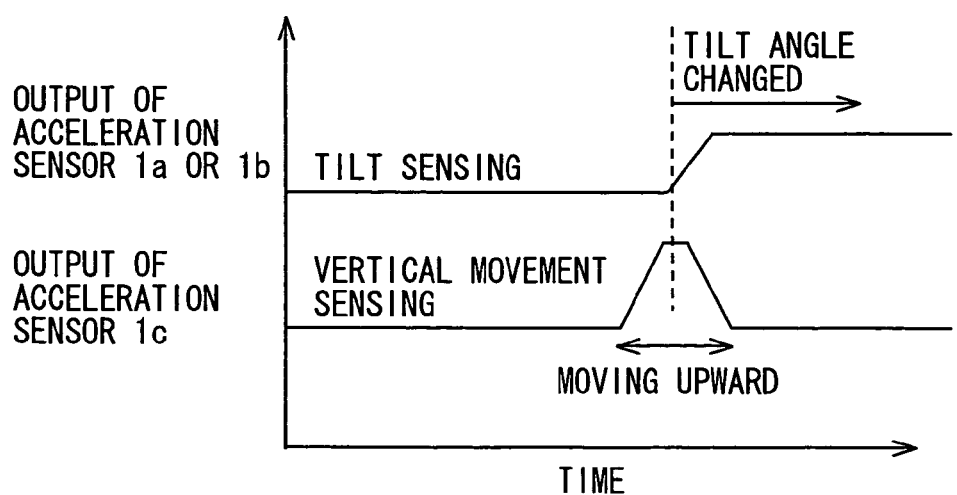
FIG. 16 is a timing chart showing a change in an acceleration in a front-to-back direction or a left-to-right direction of a vehicle and a change in an acceleration in a vertical direction of the vehicle obtained based on measurement outputs of acceleration sensors according to the fourth embodiment.

FIG. 16 shows a timing chart of the above operation. As shown in FIG. 16, when the vehicle is moved in the vertical direction, the physical value of the acceleration in the front-to-back direction or the physical value of the acceleration in the left-to-right direction, which are obtained based on the measurement outputs of the acceleration sensors 301a, 301b, may change. Therefore, a change in the tilt angle of the vehicle can be sensed based on this.

However, at this time, the physical value of the acceleration in the vertical direction of the vehicle, which is obtained based on the measurement output of the acceleration sensor 301c, may also change. Accordingly, when the physical value of the acceleration in the vertical direction of the vehicle changes, it is assumed that the vehicle is parked in the mechanical multilevel parking facility. Therefore, at that time, even when the physical value of the acceleration in the front-to-back direction of the vehicle or the physical value of the acceleration in the left-to-right direction of the vehicle changes, it is assumed that such a change is not due to the jacking up of the vehicle, and thereby the warning is not generated.

As described above, in the vehicle theft prevention system (the vehicle theft detection system) of the fourth embodiment, the acceleration sensor 301c, which can sense the acceleration in the vertical direction, is provided. Based on the physical value of the acceleration in the vertical direction, which is obtained based on the measurement output of the acceleration sensor 301c, it is determined whether the vehicle is parked in the mechanical multilevel parking facility. In the case where the acceleration in the vertical direction of the vehicle is generated due to the vertical movement of the vehicle in the mechanical multilevel parking facility, even when the acceleration in the front-to-back direction of the vehicle or the acceleration in the left-to-right direction of the vehicle is generated, it is determined that the high possibility of the stealing of the vehicle does not exist.

In this way, when the vehicle is moved in the mechanical multilevel parking facility, it is possible to limit generation of the erroneous warning, which indicates the high possibility of the stealing of the vehicle.

Fifth Embodiment

A fifth embodiment of the present invention will be described with reference to FIG. 17. A basic structure of a vehicle theft prevention system (a vehicle theft detection system) of the fifth embodiment is the same as that of the fourth embodiment. Thus, only the differences with respect to the fourth embodiment will be described.

Figure 17:
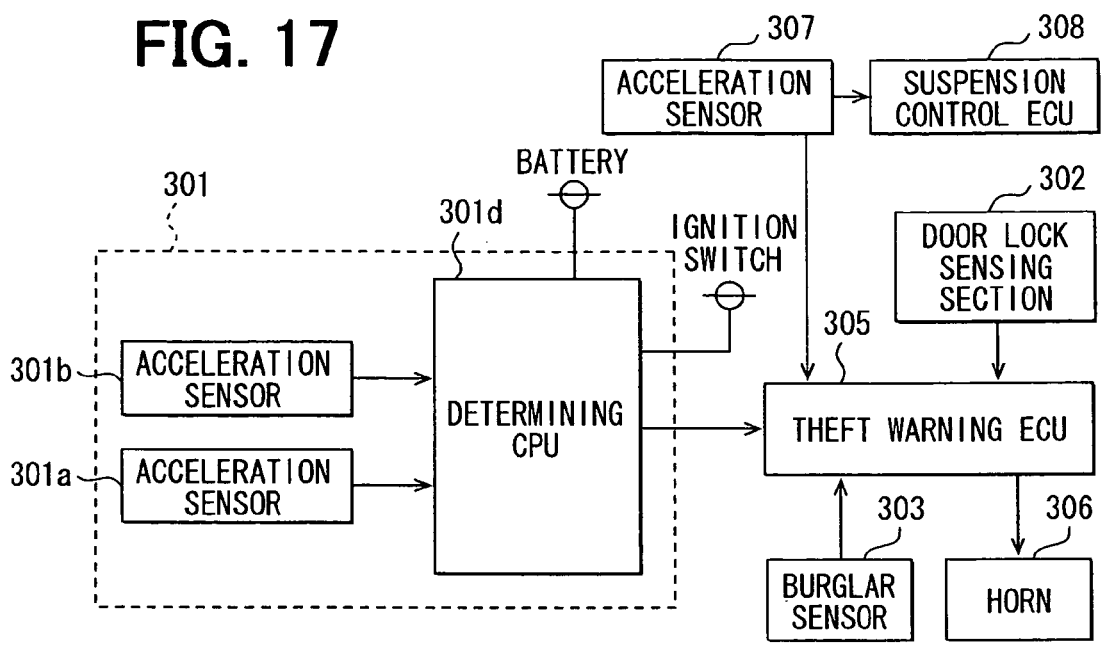
FIG. 17 is a block diagram showing a structure of a vehicle theft prevention system according to a fifth embodiment of the present invention.

FIG. 17 is a block diagram showing a structure of the vehicle theft prevention system (the vehicle theft detection system) of the fifth embodiment. As shown in FIG. 17, the vehicle theft prevention system of the fifth embodiment uses a measurement output of an acceleration sensor 307, which is also used in suspension control, to measure the acceleration in the vertical direction of the vehicle.

The measurement output of the acceleration sensor 307 is supplied to a suspension control ECU 308 to perform suspension control and is also supplied to the theft warning ECU 305 through, for example, an in-vehicle LAN. Even with such a construction, the advantages similar to those of the fourth embodiment can be achieved.

However, in such a case, the tilt sensor 301 generates the warning output based on the acceleration in the front-to-back direction of the vehicle or the acceleration in the left-to-right direction of the vehicle, which are obtained based on the measurement outputs of the acceleration sensors 301a, 301b. Then, the theft warning ECU 305 determines whether the warning output, which is outputted from the tilt sensor 301, is correct based on the acceleration in the vertical direction of the vehicle, which is obtained based on the measurement output of the acceleration sensor 307. When the theft warning ECU 305 determines that the warning output of the tilt sensor 301 is correct, the theft warning ECU 305 outputs the drive signal to the horn 306.

That is, the theft warning ECU 305 uses it's A/D converter to convert the measurement output, i.e., the analog signal of the acceleration sensor 307 into the physical value of the acceleration. Then, the theft warning ECU 305 determines whether the vehicle is parked in the mechanical multilevel parking facility based on this physical value. When the theft warning ECU 305 receives the warning output from the tilt sensor 301, the theft warning ECU 305 determines whether the acceleration in the vertical direction of the vehicle is changed. When it is determined that the acceleration in the vertical direction of the vehicle is not changed, the theft warning ECU 305 outputs the drive signal to the horn 306.

Sixth Embodiment

A sixth embodiment of the present invention will be described with reference to FIG. 18. A vehicle theft prevention system (the vehicle theft detection system) of the sixth embodiment only differs from that of the fourth embodiment in the vehicle theft warning process, which is executed by the determining CPU 301d. Thus, only the different part will be described in the following description.

In the sixth embodiment, when the security-on signal is received from the theft warning ECU 305, the determining CPU 301d monitors the stealing of the vehicle. However, when it is determined that the vehicle is parked in the mechanical multilevel parking facility, the warning is not generated until the door is unlocked.

Figure 18:
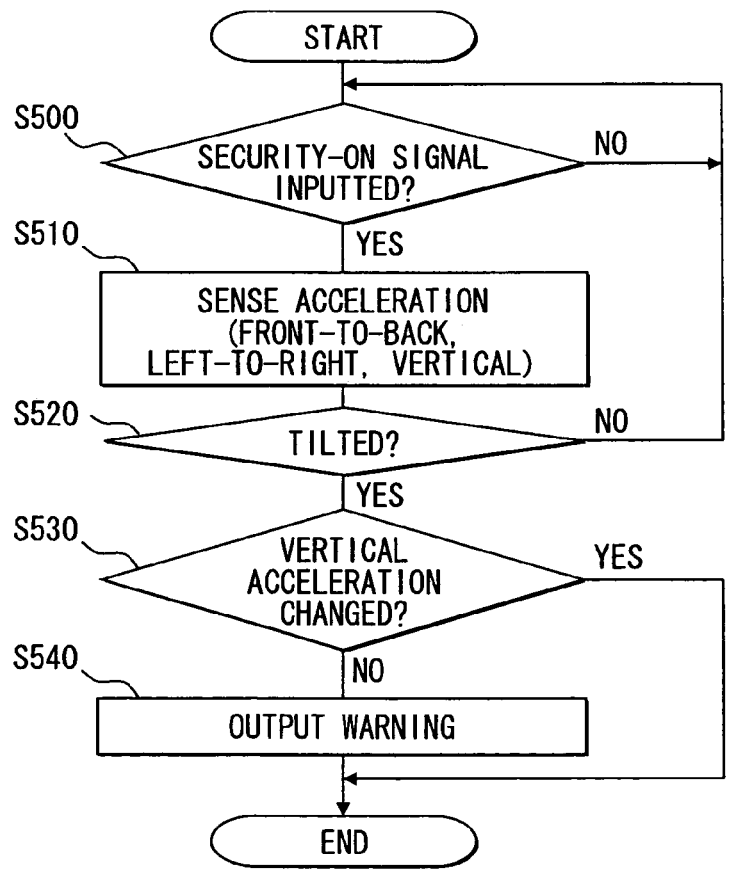
FIG. 18 is a flowchart showing a vehicle theft warning process executed at predetermined intervals by a determining CPU of a tilt sensor of a vehicle theft prevention system according to a sixth embodiment of the present invention.

FIG. 18 is a flowchart showing a vehicle theft warning process, which is executed by the determining CPU 301d of the tilt sensor 301 at predetermined intervals.

Figure 15:
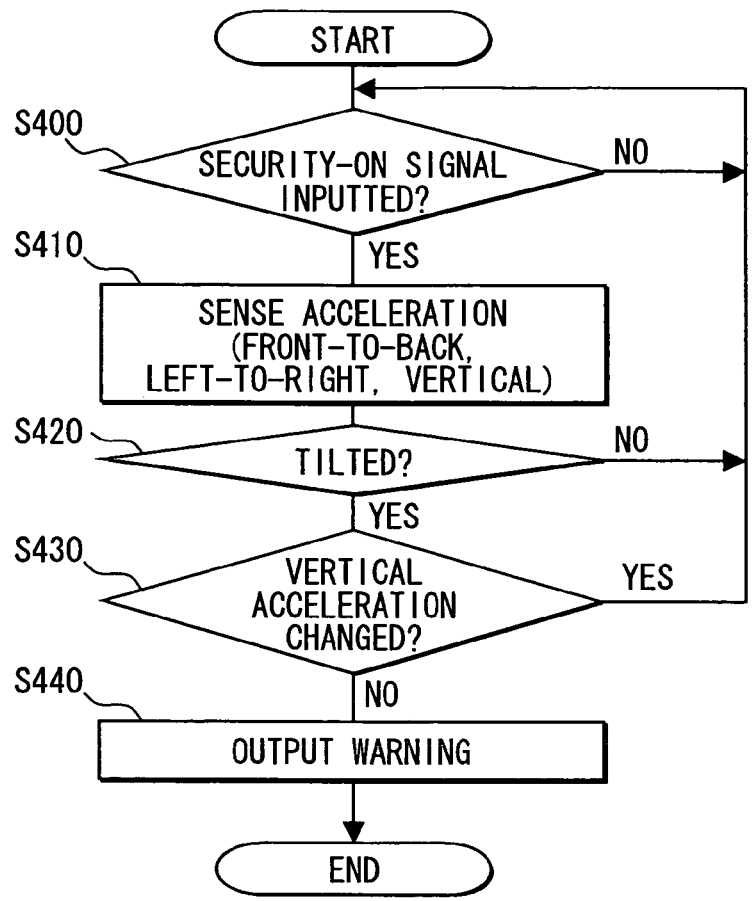
FIG. 15 is a flowchart showing a vehicle theft warning process executed at predetermined intervals by a determining CPU of the tilt sensor according to the fourth embodiment.

First, at steps S500-S530, the operation similar to that of steps S400-S430 of FIG. 15 is performed. In this case, when it is determined that the acceleration in the vertical direction of the vehicle is changed at step S530, it is assumed that the vehicle is parked in the mechanical multilevel parking facility, and the current vehicle theft warning process is terminated without taking any further action. At this time, further execution of the vehicle theft warning process at the predetermined intervals is stopped to stop generation of the warning until the door is placed in the unlocked state.

In this way, the monitoring of the stealing of the vehicle is not performed in the case where the vehicle is parked in the mechanical multilevel parking facility, so that the power consumption of the battery can be minimized.

However, even in this case, a warning may be generated at step S540 when the acceleration in the vertical direction is not kept sensed for a predetermined time period based on the measurement output of the acceleration sensor 307, which senses the vertical movement. In this way, it is possible to prevent non-generation of the warning, which is caused by erroneous sensing of the vertical movement.

(Modifications)

(1) In the first embodiment, the sensors, which are provided in the vehicle theft detection system 1, may be only two of three types of the sensors, i.e., the tilt sensor 11, the height sensors 12 and the tire pressure sensors 13. For example the tire pressure sensors 13 may be eliminated from the structure shown in FIG. 1, so that the vehicle theft detection system 1 may only include the two types of sensors, i.e., the tilt sensor 11 and the height sensors 12. In such a case, the operations, which relate to the tire pressure sensors 13, can be eliminated from the vehicle theft detection process shown in FIG. 4. Specifically, in such a case, the pressure signal is not obtained at each of steps S2 and S3, and control proceeds to step S8 without executing step S7 after execution of step S6.

In the case where the above construction is used, when the front end of the vehicle 30 is lifted and is towed by the wrecker without a notification like in the case of FIG. 5, the vehicle weight applied to the front suspensions 33 is reduced, and the front suspensions 33 are pulled downward in the vertical direction by the weight of the lifted front wheels 32a. Therefore, the height signal H1, which is sensed by the height sensor 12, significantly changes from its initial value Hi, which is obtained upon the parking of the vehicle 30. In contrast, in the case where the vehicle 30, which is parked on the pallet 50 in the multilevel parking facility, is tilted together with the pallet 50 relative to the horizontal plane G1 in such a manner that the front end of the vehicle 30 is further spaced from the horizontal plane G1 in comparison to the rear end of the vehicle 30, the height signal H1 does not substantially change. Thus, the height signal H differs between the above two cases, so that it is possible to distinguish between the above two cases.

(2) In the first embodiment, the sensors of the vehicle theft detection system 1 may only include another set of two types of sensors, i.e., the tilt sensor 11 and the tire pressure sensors 13 without the height sensors 12 of FIG. 1. In such a case, the operations, which relate to the height sensors 12, can be eliminated from the vehicle theft detection process shown in FIG. 4. Specifically, in such a case, the height signal is not obtained at each of steps S2 and S3, and control proceeds to step S7 without executing step S6 after execution of step S5.

In the case where the above construction is used, when the front end of the vehicle 30 is lifted and is towed by the wrecker without a notification like in the case of FIG. 5, the pressure signal P1 of the front wheels 32a, which is sensed by the tire pressure sensors 13, is significantly reduced from its initial value Pi, which is obtained upon the parking of the vehicle 30. In contrast, in the case where the vehicle 30, which is parked on the pallet 50 in the multilevel parking facility, is tilted together with the pallet 50 relative to the horizontal plane G1 in such a manner that the front end of the vehicle 30 is further spaced from the horizontal plane G1 in comparison to the rear end of the vehicle 30, the pressure signal P1 does not substantially change. Thus, the pressure signal P of the tire pressure sensor 13 differs between the above two cases, so that it is possible to distinguish between the above two cases.

(3) In the first embodiment, the sensors of the vehicle theft detection system 1 may only include another set of two types of sensors, i.e., the height sensors 12 and the tire pressure sensors 13 without the tilt sensor 11 of FIG. 1. In such a case, the operations, which relate to the tilt sensor 11, can be eliminated from the vehicle theft detection process shown in FIG. 4. Specifically, in such a case, the angle signal is not obtained at each of steps S2 and S3, and control proceeds to step S6 without executing step S5 after execution of step S4.

In the case where the above construction is used, when the front end of the vehicle 30 is lifted and is towed by the wrecker without a notification like in the case of FIG. 5, the pressure signal P1 of the front wheels 32a, which is sensed by the tire pressure sensors 13, is significantly reduced from its initial value Pi, which is obtained upon the parking of the vehicle 30. Furthermore, when the vehicle weight is removed from the front suspensions 33, the front suspensions 33 are pulled downward in the vertical direction by the weight of the lifted front wheels 32a. Thus, the height signal H1, which is sensed by the height sensors 12, significantly changes from its initial value Hi. In contrast, in the case where the vehicle 30, which is parked on the pallet 50 in the multilevel parking facility, is tilted together with the pallet 50 relative to the horizontal plane G1 in such a manner that the front end of the vehicle 30 is further spaced from the horizontal plane G1 in comparison to the rear end of the vehicle 30, the pressure signal P1 and the height signal H1 do not substantially change. Thus, the pressure signal P of the tire pressure sensor 13 and the height signal H of the height sensors 12 differ between the above two cases, so that it is possible to distinguish between the above two cases.

Figure 7:
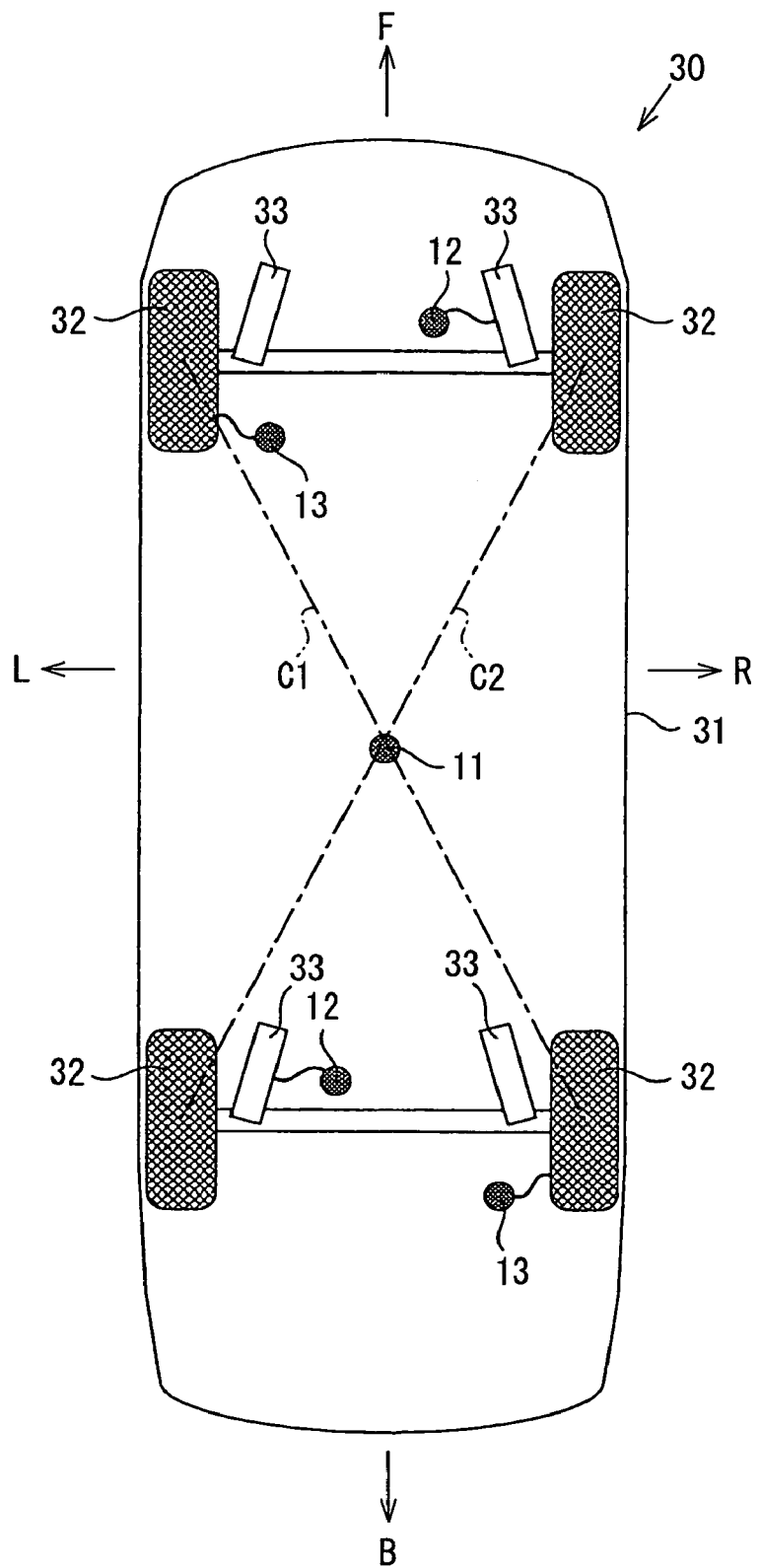
FIG. 7 is a descriptive diagram showing positions of the height sensors and of the tire pressure sensors in a modification of the first embodiment.

(4) Furthermore, in the first embodiment, as shown in FIG. 7, the height sensors 12 may be provided to at least two of the suspensions 33, which are spaced from one another in the front-to-back direction (F, B), in the left-to-right direction (L, R) or in the diagonal direction (C1, C2). In addition, the tire pressure sensors 13 may be provided to at least two of the tires 32, which are spaced from one another in the front-to-back direction (F, B), in the left-to-right direction (L, R) or in the diagonal direction (C1, C2).

For instance, two height sensors 12 may be provided to diagonally opposed two suspensions 33, respectively, which are associated with two tires 32 that are opposed to each other in the diagonal direction. Furthermore, two tire pressure sensors 13 may be provided to the left front tire 32 and the right rear tire 32, respectively.

That is, the height sensors 12 and the tire pressure sensors 13 may be arranged to associate with the four tires 32, respectively, so that each of the four tires 32 is associated with the corresponding one of the height sensors 12 and the tire pressure sensors 13.

Even with this construction, as long as the sensor signal, which is outputted from the corresponding one of the height sensors 12 and the tire pressure sensors 13, does not exceed the threshold value Hs, Ps, the vehicle theft detection system 1 will not determine that the vehicle 30 is stolen, i.e., will not determine that the vehicle 30 is in a stolen state. Thus, it is possible to limit occurrence of an erroneous detection of the stealing of the vehicle 30 in the case where the vehicle 30 has not been actually stolen. Furthermore, the at least two height sensors 12 or at least two tire pressure sensors 13 are provided. Thus, even when one of the at least two height sensors 12 or one of the at least two tire pressure sensors 13 fails, the remaining height sensor(s) 12 or the remaining tire pressure sensor(s) 13 can output its sensor signal.

Furthermore, it is possible to sense the change in the height signal H and the change in the pressure signal P, which correspond to the change in the tilt of the vehicle 30 in all of the front, back, left, and right directions. Thus, it is possible to improve the accuracy of the vehicle theft detection system 1. Furthermore, when at least two height sensors 12 are provided, it is possible to sense the change in the distance between the vehicle body 31 and the tires 32 in response to the tilt movement of the vehicle 30 in all of the front, back, left and right directions of the vehicle 30. Thus, the number of the height sensors 12 can be reduced. Similarly, when at least two tire pressure sensors 13 are provided, it is possible to sense the change in the tire pressures in response to the tilt movement of the vehicle 30 in all of the front, back, left and right directions of the vehicle 30. Thus, the number of the tire pressure sensors 13 can be reduced.

(5) In the first embodiment, the tilt sensor 11, the height sensors 12 and the tire pressure sensors 13 may be operated intermittently such that the tilt sensor 11, the height sensors 12 and the tire pressure sensors 13 sense the movement of the parked vehicle 30 and output its sensor signal only for a predetermined time period. For example, each sensor may be operated after step S1 and may be stopped after steps S2, S3. With this construction, the electric power consumption, which is required to operate the sensors, can be reduced.

In the first embodiment, the sensor signal obtaining section 21 serves as a sensor signal obtaining means of the present invention. The initial value setting section 22 serves as an initial value setting means of the present invention. The comparing section 23 serves as a comparing means of the present invention. The determining section 24 serves as a determining means of the present invention.

(6) In the second and third embodiments, the GPS sensor 61 for obtaining the coordinate information G and the map database 62 for obtaining the map information M are not required to be in the navigation apparatus 60 and may be placed in any other part of the vehicle 30.

With this construction, even in a case where the vehicle 30 does not have the navigation apparatus 60, the advantages similar to those of the second embodiment or the third embodiment can be achieved.

(7) In the second and third embodiments, the coordinate information obtaining section 42 may obtain the vertical position of the vehicle 30 as the coordinate information G. For example, the vertical coordinate information (coordinate information in the vertical direction) G of the vehicle 30 may be obtained from the GPS sensor 61.

With this construction, the advantages similar to those of the second embodiment or the third embodiment can be achieved. When the movement sensor 17 is used together with this construction, the determination accuracy for determining the stealing of the vehicle 30 can be further improved.

(8) In the second and third embodiments, the coordinate information obtaining section 42, the map information obtaining section 43 and the position recognizing section 44 may be provided in the navigation apparatus 60.

With this construction, the operations up to the recognition of the current position of the vehicle as the position of the vehicle on the map can be executed in the navigation apparatus. Thus, the construction of the entire system can be more simplified.

(9) In the second and third embodiments, the warning, which notifies the stealing of the vehicle 30, can be transmitted from the warning section 75 through the communicating means of the navigation apparatus 60.

With this construction, the above warning can be notified to, for example, the cellular phone of the user of the vehicle 30. Thus, even when the user is apart from the vehicle 30, the user can notice the stealing of the vehicle 30.

In the second and third embodiments, the coordinate information obtaining section 42 serves as a coordinate information obtaining means of the present invention. The map information obtaining section 43 serves as a map information obtaining means of the present invention. The position recognizing section 44 serves as a position recognizing means of the present invention. The judging section 45 serves as a judging means of the present invention. The determining section 46 serves as a determining means of the present invention.

In the second and third embodiments, the word "parking" refers a continuous non-moving state of the vehicle after the user turns off an engine of the vehicle and physically leaves the vehicle. "The map information" refers to information which includes geography of a land(s), geography of a river(s), geography of a sea(s), roads, buildings and the like as well as attributes of them and is associated with the coordinate information that uses the latitude and longitude. "The predetermined position or range" refers to a position or range, at which the vehicle may possibly be tilted although the vehicle is parked safely. Such a position or range may include the position or range above the water surface, such as the position or range above the surface of the sea in the case where the vehicle is transported by the ferry. Also, such a position or range may include the position or range in the pallet type multilevel parking facility where the vehicle is moved in the upward direction or the downward direction upon the parking of the vehicle.

In the second and third embodiments, although the GPS sensor 61 is considered as a position information sensing means, the GPS sensor 61 may correspond to the coordinate information obtaining means in a sense that the GPS sensor 61 can output the position of the vehicle 30 as the coordinate information G. Furthermore, the map database 62 may correspond to the map information obtaining means in a sense that the map database 62 can output the map information M.

(10) The CPU 301*d* of the fourth embodiment and the theft warning ECU 305 of the fifth embodiment perform the vehicle theft warning process. Here, the control means, which performs the vehicle theft warning process, is divided into a first control means and a second control means. However, the first control means and the second control means may be integrated into the single control means to perform the vehicle theft warning process. Also, the first control means and the second control means may be kept separated and may cooperate together to perform the vehicle theft warning process.

In such a case, in place of the signal, which is outputted from the determining CPU 301*d* to the theft warning ECU 305 and indicates the high possibility of the stealing of the vehicle, information (e.g., physical values) of the acceleration in the front-to-back direction of the vehicle and the acceleration in the left-to-right direction of the vehicle, which are obtained based on the measurement outputs of the acceleration sensors 301*a*-301*c*, may be outputted. The theft warning ECU 305 may make a final decision about whether the warning should be outputted further in view of other information (e.g., a measurement of an air pressure sensor, which senses a pressure of a tire and/or a measurement of a height sensor).

(11) In the fourth to sixth embodiments, the acceleration sensor 301*c* and the acceleration sensor 307, which sense the vertical movement, are provided inside and outside, respectively, of the tilt sensor 301. Not only in the case of providing the acceleration sensor 307 outside of the tilt sensor 301, but also in the case of providing the acceleration sensor 301*c* inside of the tilt sensor 301, the signal, which indicates the high possibility of the stealing of the vehicle determined based on the measurement outputs of the acceleration sensors 301*a*, 301*b* for sensing the tilt, may be outputted from the determining CPU 301*d* to the theft warning ECU 305, and the measurement output itself of the acceleration sensor 301*c* or the physical value of the acceleration obtained based on the measurement output of the acceleration sensor 301*c* may be supplied to the theft warning ECU 305. In this case, when the theft warning ECU 305 receives the signal, which indicates the high possibility of the stealing of the vehicle, the theft warning ECU 305 may determine whether the vertical movement of the vehicle is sensed based on the measurement output of the acceleration sensor 301*c* or the physical value of the acceleration obtained based on the measurement output of the acceleration sensor 301*c*. Then, based on the result of this determination, the theft warning ECU 305 may determine whether the warning needs to be outputted.

(12) In the fourth to sixth embodiments, even when the intrusion of the burglar into the passenger compartment of the vehicle is sensed by the burglar sensor 303, as long as it is sensed that the vehicle is parked in the mechanical multilevel parking facility, outputting of the warning may be stopped.

(13) In the fifth embodiment, the theft warning ECU 305 receives the measurement output of the acceleration sensor 307. Alternatively, the measurement output of the acceleration sensor 307 may be supplied to the determining CPU 301*d*. In such a case, similar to the fourth embodiment, the determining CPU 301*d* performs the vehicle theft warning process.

With respect to the fourth to sixth embodiments, steps indicated in the attached drawings correspond to the corresponding means, which executes the corresponding operation. For example, the horn 306 serves as a warning mean, and the door lock sensing section 302 serves as a lock state sensing means.

(14) Any one or more of the components of the theft detection system according to any one of the first to sixth embodiments can be combined with any one or more of the components of any other one of the first to sixth embodiments. For example, the tilt sensor 11, the height sensors 12, the tire pressure sensors 13 and the control unit 20 of the first embodiment may be provided in the theft detection system of any one of the second to sixth embodiments. In such a case, the control unit 20 of the first embodiment may be interconnected with or integrated with the control unit 10 of the second or third embodiment or the determining CPU 301*d* of the fourth, fifth or sixth embodiment. Also, the acceleration sensors 301*a*, 301*b* of any one of the fourth to sixth embodiments may be used as a tilt sensor in place of the tilt sensor 11 of any one of the first to third embodiments. Also, the acceleration sensor 301*c* of the fourth or sixth embodiment or the acceleration sensor 307 of the fifth embodiment may be used as a movement sensor in place of the movement sensor 17 of the third embodiment. Furthermore, the control unit 10 and the navigation apparatus 60, 61 of the second or third embodiment may be provided in the first embodiment. In addition, the door lock sensing section 302 and the burglar sensor 303 of any one of the fourth to sixth embodiments may be provided in the first embodiment.

Additional advantages and modifications will readily occur to those skilled in the art. The invention in its broader terms is therefore not limited to the specific details, representative apparatus, and illustrative examples shown and described.

What is claimed is:

1. The vehicle theft detection system that is provided in a vehicle, the vehicle theft detection system comprising:
   at least two types of sensors, which sense a behavior of the vehicle in a parked state and outputs a corresponding sensor signal that indicates the sensed behavior of the vehicle in the parked state;
   a sensor signal obtaining means for obtaining the sensor signal from each of the at least two types of sensors;
   an initial value setting means for setting an initial sensor signal of each of the at least two types of sensors, which is initially obtained by the sensor signal obtaining means upon parking of the vehicle, as an initial value of the sensor;
   a comparing means for comparing each initial value, which is set by the initial value setting means, with a current sensor signal of a corresponding one of the at least two types of sensors, which is currently obtained by the sensor signal obtaining means;
   a determining means for determining whether the vehicle is stolen based on a comparison result, which is made by the comparing means;
   a lock state sensing means for sensing a locked state and an unlocked state of a door of the vehicle; and
   a vertical movement sensing acceleration sensor that senses an acceleration in a vertical direction of the vehicle,
   wherein the determining means receives a measurement output from the vertical movement sensing acceleration sensor,
   wherein when the determining means senses the vertical movement of the vehicle based on the measurement output of the vertical movement sensing acceleration sensor, the determining means does not determine that the vehicle is in a stolen state until the unlocked state of the door is sensed by the lock state sensing means, and
   wherein the determining means determines that the vehicle is in the stolen state when the vertical movement sensing acceleration sensor does not sense the acceleration in the vertical direction of the vehicle for a predetermined time period even in a case where the lock state sensing means does not sense the unlocked state of the door.

2. The vehicle theft detection system according to claim 1, wherein the determining means determines that the vehicle is stolen when a difference between the initial value and the current sensor signal of each of the at least two types of sensors is larger than a corresponding predetermined threshold value.

3. The vehicle theft detection system according to claim 1, wherein the at least two types of sensors include:
   a tilt sensor that senses a tilt of the vehicle and outputs an angle signal based on the sensed tilt of the vehicle; and
   at least one height sensor that senses an amount of stroke of at least one of a piston rod and a spring of a shock absorber, which is provided in a corresponding one of a plurality of suspensions of the vehicle, wherein based on the sensed amount of stroke of the at least one of the piston rod and the spring, the at least one height sensor outputs a height signal, which corresponds to a distance between a vehicle body and a corresponding one of a plurality of tires of the vehicle.

4. The vehicle theft detection system according to claim 1, wherein the at least two types of sensors include:
   a tilt sensor that senses a tilt of the vehicle and outputs an angle signal based on the sensed tilt of the vehicle; and
   a plurality of tire pressure sensors, each of which is provided to a corresponding one of a plurality of tires of the vehicle to sense an air pressure of the tire and outputs a pressure signal based on the sensed air pressure of the tire.

5. The vehicle theft detection system according to claim 1, wherein the at least two types of sensors include:
   at least one height sensor that senses an amount of stroke of at least one of a piston rod and a spring of a shock absorber, which is provided in a corresponding one of a plurality of suspensions of the vehicle, wherein based on the sensed amount of stroke of the at least one of the piston rod and the spring, the at least one height sensor outputs a height signal, which corresponds to a distance between a vehicle body and a corresponding one of a plurality of tires of the vehicle; and
   a plurality of tire pressure sensors, each of which is provided to a corresponding one of the plurality of tires of the vehicle to sense an air pressure of the tire and outputs a pressure signal based on the sensed air pressure of the tire.

6. The vehicle theft detection system according to claim 1, wherein the at least two types of sensors include:
   a tilt sensor that senses a tilt of the vehicle and outputs an angle signal based on the sensed tilt of the vehicle;
   at least one height sensor that senses an amount of stroke of at least one of a piston rod and a spring of a shock absorber, which is provided in a corresponding one of a plurality of suspensions of the vehicle, wherein based on the sensed amount of stroke of the at least one of the piston rod and the spring, the at least one height sensor outputs a height signal, which corresponds to a distance between a vehicle body and a corresponding one of a plurality of tires of the vehicle; and
   a plurality of tire pressure sensors, each of which is provided to a corresponding one of the plurality of tires of the vehicle to sense an air pressure of the tire and outputs a pressure signal based on the sensed air pressure of the tire.

7. The vehicle theft detection system according to claim 3, wherein:
   the plurality of tires includes a front left tire, a front right tire, a rear left tire and a rear right tire;
   the tilt sensor is provided around an intersection between a first diagonal line, which extends over the front left tire and the rear right tire, and a second diagonal line, which extends over the front right tire and the rear left tire.

8. The vehicle theft detection system according to claim 3, wherein:
   the plurality of tires includes a front left tire, a front right tire, a rear left tire and a rear right tire;
   the plurality of suspensions includes at least two suspensions, which are associated with at least two, respectively, of the front left tire, the front right tire the rear left tire and the rear right tire; and the at least one height sensor includes at least two height sensors, which are provided to the at least two suspensions, respectively.

9. The vehicle theft detection system according to claim 4, wherein
the plurality of tires includes a front left tire, a front right tire, a rear left tire and a rear right tire; and
the plurality of tire pressure sensors includes at least two tire pressure sensors, which are provided to at least two, respectively, of the front left tire, the front right tire, the rear left tire and the rear right tire.

10. The vehicle theft detection system according to claim 1, wherein the at least two types of sensors are operated only for a predetermined time period to sense the behavior of the vehicle in the parked state and to output the corresponding sensor signal.

11. The vehicle theft detection system according to claim 1, further comprising a vertical movement sensing acceleration sensor that senses an acceleration in a vertical direction of the vehicle, wherein:
the determining means receives a measurement output from the vertical movement sensing acceleration sensor and senses a vertical movement of the vehicle based on the measurement output of the vertical acceleration sensor; and
the determining means determines that the vehicle is not stolen when the vertical movement of the vehicle is sensed through the vertical movement sensing acceleration sensor.

12. The vehicle theft detection that is provided in a vehicle, the vehicle theft detection system comprising:
at least two types of sensors, which sense a behavior of the vehicle in a parked state and outputs a corresponding sensor signal that indicates the sensed behavior of the vehicle in the parked state;
a sensor signal obtaining means for obtaining the sensor signal from each of the at least two types of sensors;
an initial value setting means for setting an initial sensor signal of each of the at least two types of sensors, which is initially obtained by the sensor signal obtaining means upon parking of the vehicle, as an initial value of the sensor;
a comparing means for comparing each initial value, which is set by the initial value setting means, with a current sensor signal of a corresponding one of the at least two types of sensors, which is currently obtained by the sensor signal obtaining means;
a determining means for determining whether the vehicle is stolen based on a comparison result, which is made by the comparing means;
a vertical movement sensing acceleration sensor that senses an acceleration in a vertical direction of the vehicle; and
at least one tilt sensing acceleration sensor, which is provided to sense an acceleration in at least one of a plurality of horizontal directions of the vehicle,
wherein the determining means receives a measurement output from the vertical movement sensing acceleration sensor and senses a vertical movement of the vehicle based on the measurement output of the vertical acceleration sensor;
wherein the determining means determines that the vehicle is not stolen when the vertical movement of the vehicle is sensed through the vertical movement sensing acceleration sensor;
wherein the determining means, the vertical movement sensing acceleration sensor, and the at least one tilt sensing acceleration sensor form a tilt sensor that senses a tilt of the vehicle;
wherein the determining means determines that the vehicle is in the stolen state upon satisfaction of the following two conditions:
the determining means senses the tilt of the vehicle based on a measurement output of the at least one tilt sensing acceleration sensor; and
the determining means does not sense the vertical movement of the vehicle based on the measurement output of the vertical movement sensing acceleration sensor; and
wherein the determining means does not determine that the vehicle is in the stolen state when the determining means senses the vertical movement of the vehicle based on the measurement output of the vertical movement sensing acceleration sensor even in a case where the determining means senses the tilt of the vehicle based on the measurement output of the at least one tilt sensing acceleration sensor.

13. The vehicle theft detection system according to claim 11, further comprising at least one tilt sensing acceleration sensor, which is provided to sense an acceleration in at least one of a plurality of horizontal directions of the vehicle, wherein:
the determining means includes a first control means and a second control means;
the first control means, the vertical movement sensing acceleration sensor and the at least one tilt sensing acceleration sensor form a tilt sensor that senses a tilt of the vehicle;
the first control means supplies a signal, which indicates information of the acceleration in the at last one of the plurality of horizontal directions of the vehicle and the acceleration in the vertical direction of the vehicle, to the second control means based on the measurement output of the at least one tilt sensing acceleration sensor and the measurement output of the vertical movement sensing acceleration sensor; and
the second control means determines whether the vehicle is in the stolen state based on the information of the acceleration in the at least one of the plurality of horizontal directions of the vehicle and the acceleration in the vertical direction of the vehicle.

14. The vehicle theft detection system that is provided in a vehicle, the vehicle theft detection system comprising:
at least two types of sensors, which sense a behavior of the vehicle in a parked state and outputs a corresponding sensor signal that indicates the sensed behavior of the vehicle in the parked state;
a sensor signal obtaining means for obtaining the sensor signal from each of the at least two types of sensors;
an initial value setting means for setting an initial sensor signal of each of the at least two types of sensors, which is initially obtained by the sensor signal obtaining means upon parking of the vehicle, as an initial value of the sensor;
a comparing means for comparing each initial value, which is set by the initial value setting means, with a current sensor signal of a corresponding one of the at least two types of sensors, which is currently obtained by the sensor signal obtaining means;
a determining means for determining whether the vehicle is stolen based on a comparison result, which is made by the comparing means;

a vertical movement sensing acceleration sensor that senses an acceleration in a vertical direction of the vehicle; and at least one tilt sensing acceleration sensor, which is provided to sense an acceleration in at least one of a plurality of horizontal directions of the vehicle, wherein the determining means receives a measurement output from the vertical movement sensing acceleration sensor and senses a vertical movement of the vehicle based on the measurement output of the vertical acceleration sensor;

wherein the determining means determines that the vehicle is not stolen when the vertical movement of the vehicle is sensed through the vertical movement sensing acceleration sensor;

wherein the determining means includes a first control means and a second control means;

wherein the first control means and the at least one tilt sensing acceleration sensor form a tilt sensor that senses a tilt of the vehicle;

wherein the vertical movement sensing acceleration sensor is provided outside of the tilt sensor;

wherein the first control means supplies a signal, which indicates a relatively high possibility of stealing of the vehicle, to the second control means when the first control means senses the tilt of the vehicle based on a measurement output of the at least one tilt sensing acceleration sensor;

wherein the second control means determines that the vehicle is in the stolen state when the second control means receives the signal, which indicates the relatively high possibility of stealing of the vehicle, from the second control means as long as the second control means does not sense the vertical movement of the vehicle based on the measurement output of the vertical movement sensing acceleration sensor; and wherein the second control means determines that the vehicle is not in the stolen state when the second control means senses the vertical movement of the vehicle based on the measurement output of the vertical movement sensing acceleration sensor even in a state where the second control means receives the signal, which indicates the relatively high possibility of stealing of the vehicle, from the first control means.

15. The vehicle theft detection system according to claim 11, further comprising at least one tilt sensing acceleration sensor, which is provided to sense an acceleration in at least one of a plurality of horizontal directions of the vehicle, wherein:

the determining means includes a first control means and a second control means;

the first control means and the at least one tilt sensing acceleration sensor form a tilt sensor that senses a tilt of the vehicle;

the vertical movement sensing acceleration sensor is provided outside of the tilt sensor;

the first control means receives the measurement output of the vertical movement sensing acceleration sensor;

the first control means outputs a signal, which indicates information of the acceleration in the at least one of the plurality of horizontal directions of the vehicle and the acceleration in the vertical direction of the vehicle, to the second control means based on the measurement output of the at least one tilt sensing acceleration sensor and the measurement output of the vertical movement sensing acceleration sensor; and the second control means determines whether the vehicle is in the stolen state based on the information of the acceleration in the at least one of the plurality of horizontal directions of the vehicle and the acceleration in the vertical direction of the vehicle.

16. The vehicle theft detection system that is provided in a vehicle, the vehicle theft detection system comprising:

at least two types of sensors, which sense a behavior of the vehicle in a parked state and outputs a corresponding sensor signal that indicates the sensed behavior of the vehicle in the parked state;

a sensor signal obtaining means for obtaining the sensor signal from each of the at least two types of sensors;

an initial value setting means for setting an initial sensor signal of each of the at least two types of sensors, which is initially obtained by the sensor signal obtaining means upon parking of the vehicle, as an initial value of the sensor;

a comparing means for comparing each initial value, which is set by the initial value setting means, with a current sensor signal of a corresponding one of the at least two types of sensors, which is currently obtained by the sensor signal obtaining means;

a determining means for determining whether the vehicle is stolen based on a comparison result, which is made by the comparing means;

a vertical movement sensing acceleration sensor that senses an acceleration in a vertical direction of the vehicle;

at least one tilt sensing acceleration sensor, which is provided to sense an acceleration in at least one of a plurality of horizontal directions of the vehicle; and a theft sensor, which is different from the tilt sensor, wherein the determining means receives a measurement output from the vertical movement sensing acceleration sensor and senses a vertical movement of the vehicle based on the measurement output of the vertical acceleration sensor;

wherein the determining means determines that the vehicle is not stolen when the vertical movement of the vehicle is sensed through the vertical movement sensing acceleration sensor;

wherein the determining means includes a first control means and a second control means;

wherein the first control means, the vertical movement sensing acceleration sensor and the at least one tilt sensing acceleration sensor form a tilt sensor that senses a tilt of the vehicle;

wherein the first control means supplies a signal, which indicates information of the acceleration in the at last one of the plurality of horizontal directions of the vehicle and the acceleration in the vertical direction of the vehicle, to the second control means based on the measurement output of the at least one tilt sensing acceleration sensor and the measurement output of the vertical movement sensing acceleration sensor;

wherein the second control means determines whether the vehicle is in the stolen state based on the information of the acceleration in the at least one of the plurality of horizontal directions of the vehicle and the acceleration in the vertical direction of the vehicle;

wherein the second control means receives a measurement output of the theft sensor; and wherein when the signal, which is received from the first control means, indicates that the vertical movement of the vehicle is sensed, the second control means does not determine that the vehicle is in the stolen state even in a case where the measurement output of the theft sensor indicates a relatively high possibility of stealing of the vehicle.

17. The vehicle theft detection system according to claim 11, wherein:
the vertical movement sensing acceleration sensor is connected to an in-vehicle LAN; and
the measurement output of the vertical movement sensing acceleration sensor is supplied to the determining means through the in-vehicle LAN.

18. The vehicle theft detection system according to claim 11, wherein the vertical movement sensing acceleration sensor is provided to control a suspension of the vehicle.

19. The vehicle theft detection system that is provided in a vehicle, the vehicle theft detection system comprising:
at least two types of sensors, which sense a behavior of the vehicle in a parked state and outputs a corresponding sensor signal that indicates the sensed behavior of the vehicle in the parked state;
a sensor signal obtaining means for obtaining the sensor signal from each of the at least two types of sensors;
an initial value setting means for setting an initial sensor signal of each of the at least two types of sensors, which is initially obtained by the sensor signal obtaining means upon parking of the vehicle, as an initial value of the sensor;
a comparing means for comparing each initial value, which is set by the initial value setting means, with a current sensor signal of a corresponding one of the at least two types of sensors, which is currently obtained by the sensor signal obtaining means;
a determining means for determining whether the vehicle is stolen based on a comparison result, which is made by the comparing means;
a map information obtaining means for obtaining map information;
a coordinate information obtaining means for obtaining a current position of the vehicle as coordinate information;
a position recognizing means for recognizing the current position of the vehicle as a position of the vehicle on a map, which is generated based on the map information that is obtained by the map information obtaining means, wherein the position recognizing means recognizes the current position of the vehicle as the position of the vehicle on the map according to the map information, which is obtained by the map information obtaining means, and the coordinate information, which is obtained by the coordinate information obtaining means; and
a judging means for judging whether the position of the vehicle on the map recognized by the position recognizing means is in a predetermined position or range, wherein when the judging means judges that the position of the vehicle on the map is not in the predetermined position or area, the determining means determines whether the vehicle is stolen based on angle information, which is outputted from the tilt sensor, wherein the at least two types of sensors include:
a tilt sensor that senses a tilt of the vehicle and outputs an angle signal based on the sensed tilt of the vehicle; and
at least one height sensor that senses an amount of stroke of at least one of a piston rod and a spring of a shock absorber, which is provided in a corresponding one of a plurality of suspensions of the vehicle, wherein based on the sensed amount of stroke of the at least one of the piston rod and the spring, the at least one height sensor outputs a height signal, which corresponds to a distance between a vehicle body and a corresponding one of a plurality of tires of the vehicle.

20. The vehicle theft detection system according to claim 19, further comprising a movement sensor, which senses movement of the vehicle in an upward direction or a downward direction of the vehicle and outputs movement information based on the sensed movement of the vehicle, wherein the judging means determines whether the position of the vehicle on the map is in the predetermined position or range based on the movement information received from the movement sensor.

21. The vehicle theft detection system according to claim 19, wherein the coordinate information obtaining means obtains a current vertical position of the vehicle as the coordinate information.

22. The vehicle theft detection system according to claim 19, wherein the map information obtaining means obtains the map information from a map database of a navigation apparatus.

23. The vehicle theft detection system according to claim 22, wherein the map information obtaining means, the coordinate information obtaining means and the position recognizing means are provided in the navigation apparatus.

24. A vehicle theft detection system comprising:
a tilt sensor that senses a tilt of a parked vehicle and outputs an angle information based on the sensed tilt of the vehicle;
a map information obtaining means for obtaining map information;
a coordinate information obtaining means for obtaining a current position of the vehicle as coordinate information;
a position recognizing means for recognizing the current position of the vehicle as a position of the vehicle on a map, which is generated based on the map information that is obtained by the map information obtaining means, wherein the position recognizing means recognizes the current position of the vehicle as the position of the vehicle on the map according to the map information, which is obtained by the map information obtaining means, and the coordinate information, which is obtained by the coordinate information obtaining means;
a judging means for judging whether the position of the vehicle on the map recognized by the position recognizing means is in a predetermined position or range; and a determining means for determining whether the vehicle is stolen based on the angle information, which is outputted from the tilt sensor, when the judging means judges that the position of the vehicle on the map is not in the predetermined position or area.

25. A vehicle theft detection system comprising:

at least one tilt sensing acceleration sensor, which is provided to sense an acceleration in at least one of a plurality of horizontal directions of a parked vehicle;

a vertical movement sensing acceleration sensor that senses an acceleration in a vertical direction of the vehicle; and a determining means for determining whether the vehicle is stolen based on a measurement output of the at least one tilt sensing acceleration sensor and a measurement output of the vertical movement sensing acceleration sensor, wherein the determining means determines that the vehicle is stolen upon satisfaction of the following two conditions:

the measurement output of the at least one tilt sensing acceleration sensor indicates a tilt of the vehicle; and the measurement output of the vertical movement sensing acceleration sensor does not indicate vertical movement of the vehicle.

* * * * *

UNITED STATES PATENT AND TRADEMARK OFFICE
CERTIFICATE OF CORRECTION

PATENT NO. : 7,598,847 B2  Page 1 of 1
APPLICATION NO. : 11/543988
DATED : October 6, 2009
INVENTOR(S) : Suzuki et al.

It is certified that error appears in the above-identified patent and that said Letters Patent is hereby corrected as shown below:

Title page Item (12) inventor

Change "Fukagawa et al." to
 --Suzuki et al.--.

Item (75) Inventors

Replace "Satoru Fukagawa, Kariya (JP);
 Teruhito Suzuki, Kariya (JP);
 Norifumi Souda, Obu (JP)" with --Teruhito Suzuki, Kariya (JP);
 Norifumi Souda, Obu (JP)--.

Signed and Sealed this

Sixteenth Day of November, 2010

David J. Kappos
*Director of the United States Patent and Trademark Office*